(12) United States Patent
Armangau et al.

(10) Patent No.: US 11,093,454 B2
(45) Date of Patent: Aug. 17, 2021

(54) SPEEDING DEDUPLICATION USING A MOST WANTED DIGEST CACHE

(71) Applicant: EMC IP Holding Company LLC, Hopkinton, MA (US)

(72) Inventors: Philippe Armangau, Acton, MA (US); Christopher A. Seibel, Walpole, MA (US); Bruce E. Caram, Hudson, MA (US); Yubing Wang, Southborough, MA (US); John Gillono, North Chelmsford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 893 days.

(21) Appl. No.: 15/799,117

(22) Filed: Oct. 31, 2017

(65) Prior Publication Data
US 2019/0129970 A1 May 2, 2019

(51) Int. Cl.
*G06F 16/174* (2019.01)
*G06F 16/13* (2019.01)
*G06F 11/14* (2006.01)

(52) U.S. Cl.
CPC ...... *G06F 16/1748* (2019.01); *G06F 11/1453* (2013.01); *G06F 16/13* (2019.01); *G06F 16/137* (2019.01)

(58) Field of Classification Search
CPC . G06F 16/137; G06F 11/1453; G06F 16/1748
See application file for complete search history.

(56) References Cited

U.S. PATENT DOCUMENTS

| 8,799,601 | B1 | 8/2014 | Chen et al. |
| 9,645,932 | B1 | 5/2017 | Bono et al. |
| 9,727,479 | B1 | 8/2017 | Armangau et al. |
| 9,779,023 | B1 | 10/2017 | Armangau et al. |
| 9,985,649 | B1 | 5/2018 | Bassov et al. |
| 10,037,336 | B1 | 7/2018 | Hu et al. |

(Continued)

OTHER PUBLICATIONS

Philippe Armangau, et al.; "Content-Based Caching Using Digests," U.S. Appl. No. 15/668,307, filed Aug. 3, 2017.

(Continued)

*Primary Examiner* — Charles E Lu
(74) *Attorney, Agent, or Firm* — BainwoodHuang

(57) ABSTRACT

Embodiments are directed to techniques for performing deduplication. A method includes (a) obtaining a digest of a data block logically-positioned within a filesystem, the digest providing a hash value of data of the data block, (b) searching a Most Wanted Digest Cache (MWDC) within system memory for the digest, (c) locating an entry in the MWDC using the digest, wherein this locating indicates that the data block has the same data as another data block located elsewhere within the filesystem, the other data block having been previously persistently-stored, the entry having been added to the MWDC in response to the other data block having been deduplicated at least a plurality number of times, (d) locating a mapping structure referenced by the entry located from the MWDC, the mapping structure providing metadata about the other data block, and (e) deduplicating the data block and the other data block with reference to the located mapping structure.

17 Claims, 9 Drawing Sheets

(56) References Cited

U.S. PATENT DOCUMENTS

| | | | | |
|---|---|---|---|---|
| 2009/0287901 | A1* | 11/2009 | Abali | G06F 12/1018 711/206 |
| 2010/0106691 | A1* | 4/2010 | Preslan | G06F 11/1464 707/674 |
| 2011/0107052 | A1* | 5/2011 | Narayanasamy | G06F 3/064 711/171 |
| 2011/0231362 | A1* | 9/2011 | Attarde | G06F 11/3442 707/609 |
| 2011/0246741 | A1* | 10/2011 | Raymond | G06F 16/137 711/170 |
| 2013/0218854 | A1* | 8/2013 | Mungi | G06F 16/10 707/697 |
| 2014/0310476 | A1* | 10/2014 | Kruus | G06F 12/0871 711/133 |

OTHER PUBLICATIONS

Philippe Armangau, et al.; "Speeding De-Duplication Using a Temporal Digest Cache," U.S. Appl. No. 15/668,388, filed Aug. 3, 2017.

Ilya Usvyatsky, et al.; "Performing Reconciliation on a Segmented De-Duplication Index to Reference Just One of a First Copy and a Second Copy of a Particular Data Block," U.S. Appl. No. 15/664,185, filed Jul. 31, 2017.

Nickolay Alexandrovich; "Maintaining a Single Copy of Data Within a Read Cache," U.S. Appl. No. 16/066,498, filed Jun. 27, 2018.

Philippe Armangau, et al.; "Inline Deduplication of Compressed Data," U.S. Appl. No. 14/980,944, filed Dec. 28, 2015.

Jean-Pierre Bono, et al.; "Selective Application of Block Virtualization Structures in a File System," U.S. Appl. No. 14/577,387, filed Dec. 19, 2014.

Ilya Usvyatsky, et al.; "Techniques for De-Duplicating Data Storage Systems Using a Segmented Index," U.S. Appl. No. 15/394,376, filed Dec. 29, 2016.

Yining Si, et al.; "Inline Compression With Small-Write Compression Avoidance," U.S. Appl. No. 15/662,676, filed Jul. 28, 2017.

Philippe Armangau, et al.; "Overwriting Compressed Data Extents," U.S. Appl. No. 15/499,206, filed Apr. 27, 2017.

Yining Si, et al.; "Write Tagging for Selective Avoidance of Inline Compression," U.S. Appl. No. 15/499,467, filed Apr. 27, 2017.

Ivan Bassov, et al.; "Compressing Data In Line Using Weighted Compression Budgets," U.S. Appl. No. 15/392,639, filed Dec. 28, 2016.

Yaming Kuang, et al.; "Recovering Compressed Data to Reduce Data Loss," U.S. Appl. No. 15/395,968, filed Dec. 30, 2016.

Philippe Armangau, et al.; "Avoiding Data-Log Bypass to Promote Inline Deduplication During Copies," U.S. Appl. No. 15/798,580, filed Oct. 31, 2017.

Philippe Armangau, et al.; "Managing File System Metadata Using Persistent Cache," U.S. Appl. No. 15/669,364, filed Aug. 4, 2017.

Philippe Armangau, et al.; "Efficiently Managaing Reference Weights for Write Splits," U.S. Appl. No. 15/086,629, filed Mar. 31, 2016.

* cited by examiner

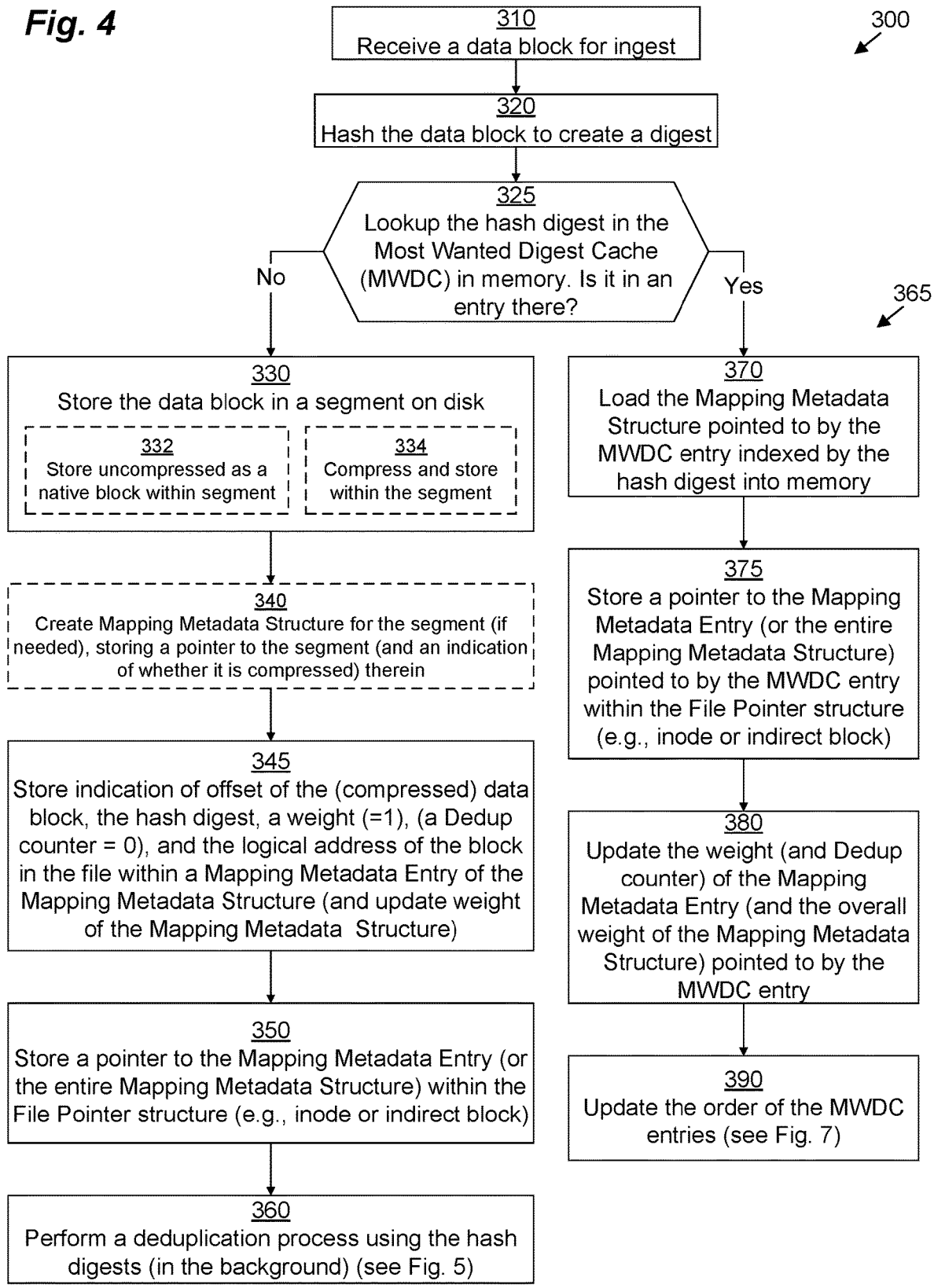

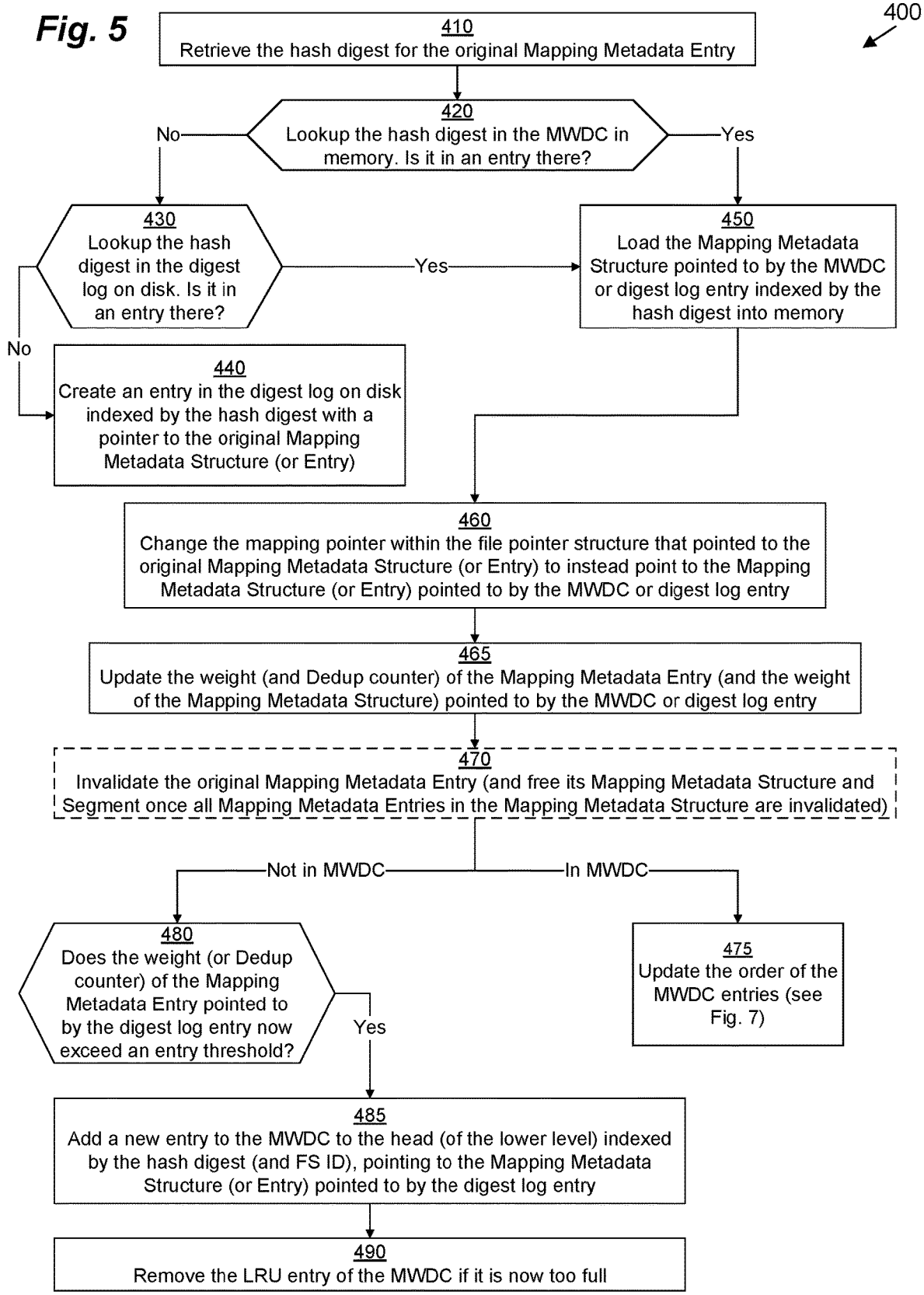

SPEEDING DEDUPLICATION USING A MOST WANTED DIGEST CACHE

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Data storage systems commonly arrange data in structures known as file systems. Such file systems include both data and metadata. The metadata organizes the file data on disk, such that each file's data can be located, placed in proper sequence, and kept separate from other files' data.

Some file systems employ deduplication. To perform deduplication, a program searches a file system for data blocks having identical values. The program then replaces duplicate blocks with pointers to a single retained copy. Deduplication can save considerable space in file systems that store multiple copies of the same data.

SUMMARY

Conventional approaches to deduplication repeatedly read data from disk, compute digests, search for duplicates, and reconfigure metadata when duplicates are found. This process may involve keeping a digest log that maps all digests previously computed with respective metadata structures used to keep track of the deduplication. Since the number of unique blocks on a data storage system is typically very large, this digest log is stored on disk. Unfortunately, such activity can result in large numbers of disk accesses, which can interfere with more critical data storage functions, especially when a data storage system is busy servicing host applications. For example, every time a new block is deduplicated, the on-disk digest log must be searched for the appropriate metadata structure even if that metadata structure has been accessed very frequently. In addition, due to the high overhead, conventional approaches to deduplication are performed as a background process.

Thus, it would be desirable to implement a deduplication system that minimizes disk accesses to the on-disk digest log when deduplicating popular data blocks. It would further be desirable to allow deduplication to be performed in-line when possible. In contrast with the above-described prior approach, improved techniques for performing deduplication utilize an in-memory most wanted digest cache. When it is determined that a particular block of data has been deduplicated frequently enough (e.g., more than a threshold number of times), an entry for that block is added into the in-memory most wanted digest cache so that time-consuming access to the on-disk digest log may be avoided in the future. Because popular blocks can now be deduplicated without having to access the on-disk digest log, these popular blocks can be deduplicated in-line as soon as they are ingested.

In one embodiment, a method of performing deduplication in a filesystem is performed by a computing device. The method includes (a) obtaining a digest of a data block logically-positioned within a filesystem managed by the computing device, the digest providing a hash value of data of the data block, (b) searching a Most Wanted Digest Cache (MWDC) within system memory of the computing device for the digest, (c) locating an entry in the MWDC within system memory using the digest, wherein this locating indicates that the data block has the same data as another data block located elsewhere within the filesystem, the other data block having been previously persistently-stored by the computing device, the entry having been added to the MWDC in response to the other data block having been deduplicated at least a plurality number of times, (d) locating a mapping structure referenced by the entry located from the MWDC, the mapping structure providing metadata about the other data block, and (e) deduplicating the data block and the other data block with reference to the located mapping structure.

An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 4 is a flowchart depicting example methods of various embodiments.

FIG. 5 is a flowchart depicting example methods of various embodiments.

DETAILED DESCRIPTION OF THE INVENTION

Embodiments are directed to techniques for implementing a deduplication system that minimizes disk accesses to an on-disk digest log when deduplicating popular data blocks. Some embodiments are directed to techniques that further allow deduplication to be performed in-line under certain conditions. In contrast with prior approaches, improved techniques for performing deduplication utilize an in-memory most wanted digest cache. When it is determined that a particular block of data has been deduplicated frequently enough (e.g., more than a threshold number of times), an entry for that block is added into the in-memory most wanted digest cache so that time-consuming access to the on-disk digest log may be avoided in the future. Because popular blocks can now be deduplicated without having to access the on-disk digest log, these popular blocks can be deduplicated in-line as soon as they are ingested.

Figure 1A:
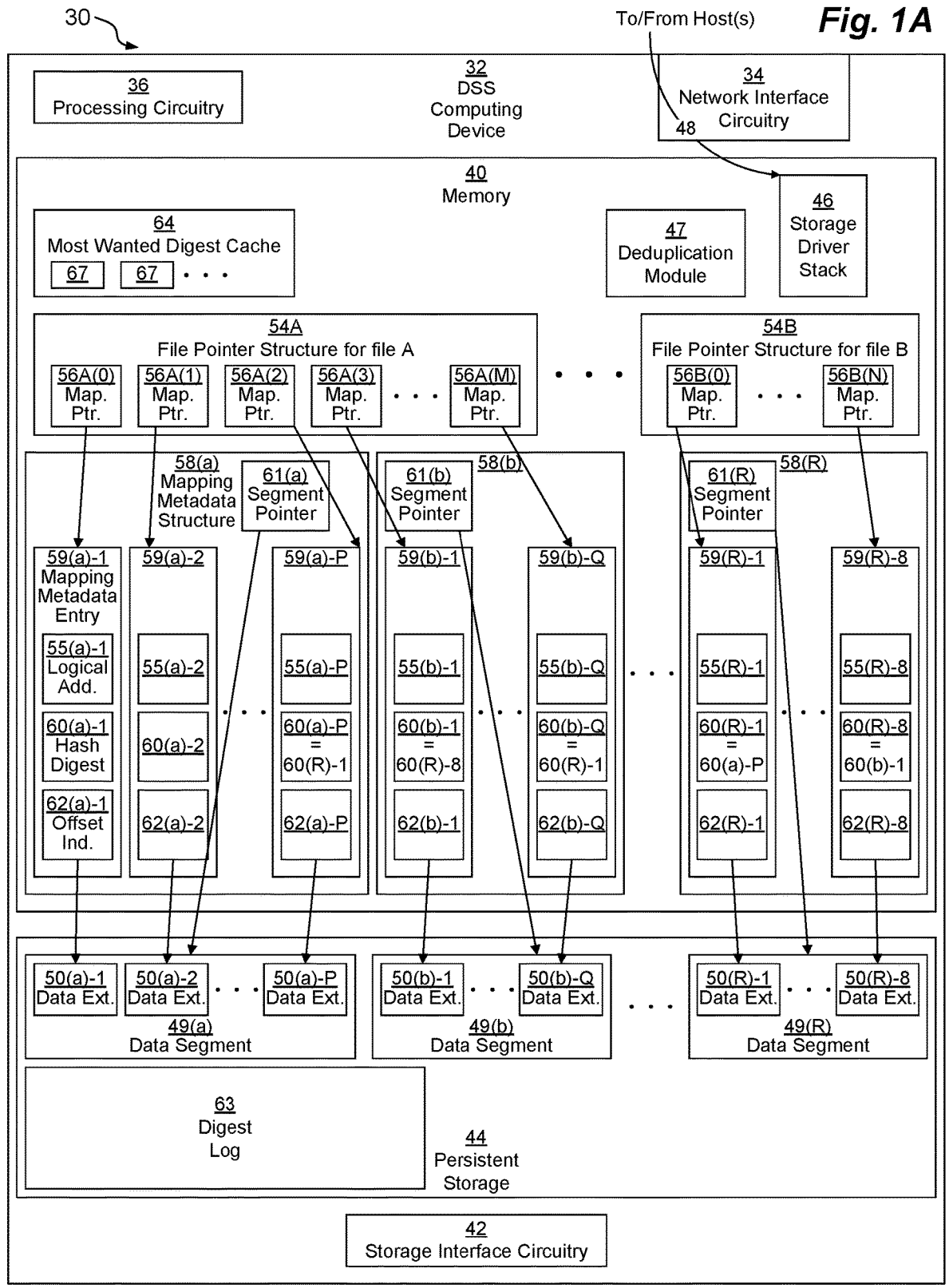
FIG. 1A is a block diagram depicting an example apparatus for use in connection with various embodiments, including an example arrangement of data structures.

FIG. 1A depicts an example environment 30 including a computing device 32 serving as a data storage system (DSS). DSS computing device 32 may be any kind of computing device, such as, for example, a personal computer, workstation, server computer, enterprise server, DSS rack server, laptop computer, tablet computes, smart phone, mobile computer, etc. In an example, computing device 32 is a DSS rack server.

DSS computing device 32 includes network interface circuitry 34, processing circuitry 36, memory 40, storage interface circuitry 42, and persistent data storage 44. DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network (not depicted). Network interface circuitry 34 allows the DSS computing device 32 to communicate with one or more host devices (not depicted) capable of sending data storage commands to the DSS computing device 32 over the network for fulfillment.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, DSS computing device 32 may be built as a set of two or more storage processors (SPs, not depicted) each mounted on a separate board, each SP having its own network interface circuitry 34, processing circuitry 36, memory 40, and storage interface circuitry 42, but sharing the storage 44 between them. In such embodiments, a high-speed inter-SP bus may connect the SPs. There may be more than one SP installed in DSS computing device 32 for redundancy and performance reasons. In these embodiments, each SP may be considered independently for purposes of this disclosure.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a storage driver stack 46 (which may include several different storage-related drivers, not depicted, that are arranged in a stack configuration) which executes on processing circuitry 36 to fulfill data storage requests from hosts as well as a deduplication module 47 which executes on processing circuitry 36 to deduplicate data stored in persistent data storage 44. Memory 40 also includes a Most Wanted Digest Cache (MWDC) 64 (which may store various entries 67) as well as various other data structures used by the OS, storage driver stack 46, deduplication module 47, MWDC 64, and various other applications (not depicted). This data includes file pointer structures 54 and mapping metadata structures 58, for example.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS, applications, storage driver stack 46, deduplication module 47, file pointer structures 54, and mapping metadata 58 are typically stored in this persistent storage portion of memory 40 or on persistent storage 44 so that they may be loaded into a system portion of memory 40 from this persistent storage portion of memory 40 or persistent storage 44 upon a system restart or as needed. Both the storage driver stack 46 and the deduplication module 47, when stored in non-transient form either in the volatile portion of memory 40 or on persistent storage drives 44 or in persistent portion of memory 40, each forms a respective computer program product. The processing circuitry 36 running one or more applications and/or storage driver stack 46 thus forms a specialized circuit constructed and arranged to carry out the various processes described herein.

It should be understood that access to persistent storage 44 is typically slower than access to memory 40 (excluding the persistent storage portion of memory 40), typically by an order of magnitude or more.

In operation, a host sends data storage requests 48 to storage driver stack 46, which processes these commands. A data storage request 48 may be of various types, includes READ and WRITE requests, for example. In some examples, data storage requests 48 are file-based requests aimed at logical addresses within files (not depicted) of filesystems (not depicted) that are stored on logical disks (LUNs, not depicted) that are backed by persistent storage 44 as is well-known in the art. In other examples, data storage requests 48 are block-based requests aimed at offsets within particular LUNs. In such cases, the storage driver stack 46 may translate block-based requests into file-based requests directed to a file or files within an internal file system. Storage driver stack 46 fulfills the storage requests 48 by transforming these storage requests into low-level data storage requests aimed at particular addresses within the persistent storage 44, executing these low-level storage requests either via the storage interface circuitry 42 and the persistent storage or via an in-memory cache.

When a data storage request 48 is a WRITE request to write data to a file (or another similar structure) that is mapped by a file pointer structure 54 (such as an inode pointer structure made up of an inode and, if necessary, a set of indirect blocks) containing a set of mapping pointers 56 to locate the data for the file, storage driver stack 46 accesses a particular mapping pointer 56 based on the requested address within the file. The mapping pointer 56 points to a mapping metadata entry 59, such as within an extent list, within a mapping metadata structure 58, which may include a virtual block map (VBM), of the DSS computing device 32. Each mapping metadata structure 58 includes a segment pointer 61 that points to a data segment 49 in persistent storage 44. A data segment 49 is a group of concatenated data blocks (see data extents 50(R)-1 through 50(R)-8 that make up data segment 49(R)). In one embodiment, each data segment 49 includes eight data blocks. Each metadata entry 59 includes an offset indication 62 that indicates where a data extent 50 (that stores data of the file) is stored within the data segment 49. In some embodiments, offset indication 62 may be implicit in the arrangement of various data structures; see below in connection with FIGS. 2 and 3. Data extents 50 may either be compressed or uncompressed. When uncompressed, data extents 50 are blocks (e.g., 512 bytes, 4 kilobytes, 8 kilobytes, etc.) of the persistent storage 44 that store a block of data logically addressed by a mapping pointer 56. When uncompressed, data extents 50 are compressed to be smaller than a block, such that they store compressed data that when decompressed is logically addressed by a mapping pointer 56. Additional information about extent lists and VBMs may be found in co-pending U.S. patent application Ser. No. 15/499,206, filed Apr. 27, 2017, the contents and teachings of which are incorporated herein by this reference.

Each mapping metadata entry 59 also stores a hash digest 60 that represents the data stored within its respective data extent 50. Hash digest 60 may be, for example, a value that was generated by applying a cryptographic hashing algorithm to the data stored within the extent. In an example, the hashing algorithm is SHA-2, although this is not required, as other algorithms may also be used, such as SHA-0, SHA-1, SHA-3, and MD5. Such algorithms may provide bit-depths such as 128 bits, 160 bits, 172 bits, 224 bits, 256 bits, 384 bits, and 512 bits, for example). Preferably an advanced hashing algorithm with a high bit-depth is used to ensure a low probability of hash collisions between different data blocks, such as fewer than one collision in $2^{80}$ or $2^{128}$, for example.

Hash digests 60 are used to implement a data deduplication feature. Thus, several different mapping pointers 56 located within a single file pointer structure 54 (for a single file) or within different file pointer structures 54 (for more than one file) may all point to the same mapping metadata entry 59 (see FIG. 1B). This allows data portions within a single file or within several different files that all store identical content to be backed by only one data extent 50 on persistent storage 44, since they all have identical data and thus produce identical hash digests 60. It should be noted that, although in principle, a data extent 50 may be shared between files of different filesystems, in some embodiments, any given data extent 50(X) is only shared within a given filesystem.

When a data storage request 48 is a WRITE to a particular file, such as file A, a particular mapping pointer 56A(x) within a file pointer structure 54A for file A is accessed to logically map the data being written to a particular block (i.e., block number x) a logical location within file A. If the WRITE is to a block within file A that was previously empty, then the particular mapping pointer 56A(x) is set to point to a new mapping metadata entry 59 within a mapping metadata structure 58. For example, when data is first written to the first logical block of file A, mapping pointer 56A(0) is set to point to mapping metadata entry 59(a)-1 within mapping metadata structure 58(a). Segment pointer 61(a) indicates that data associated with this mapping metadata structure 58(a) is stored within segment 49(a) in persistent storage 44. Offset indicator 62(a)-1 indicates that the data for that mapping metadata entry 59(a)-1 is stored within that data segment 49(a) at data extent 50(a)-1. Mapping metadata entry 59(a)-1 also stores a logical address 55(a)-1 of the data block within either file A or within the filesystem within which file A is stored (i.e., a block number within a volume on which the filesystem is housed). Mapping metadata entry 59(a)-1 also stores hash digest 60(a)-1 of the contents of the data stored in data extent 50(a)-1.

As depicted, in addition to mapping pointer 56A(0) pointing to mapping metadata entry 59(a)-1 which indicates that the data is stored in extent 50(a)-1 in persistent storage 44, additional mapping pointers 56A of file A are also shown. As depicted, file A has M+1 logical blocks, mapped by mapping pointers 56A(0), 56A(1), 56A(2), 56A(3), . . . , 56A(M). Mapping pointer 56A(1) points to mapping metadata entry 59(a)-2 which indicates that the data is stored in extent 50(a)-2 in persistent storage 44. Mapping pointer 56A(2) points to mapping metadata entry 59(a)-P which indicates that the data is stored in extent 50(a)-P in persistent storage 44. Mapping pointer 56A(3) points to mapping metadata entry 59(b)-1 which indicates that the data is stored in extent 50(b)-1 in persistent storage 44. Mapping pointer 56A(M) points to mapping metadata entry 59(b)-Q which indicates that the data is stored in extent 50(b)-Q in persistent storage 44.

WRITE data storage requests 48 may also be directed at file B. These are initially processed so that mapping pointer 56B(0) points to mapping metadata entry 59(R)-1 which indicates that the data is stored in extent 50(R)-1 in persistent storage 44 and mapping pointer 56B(N) points to mapping metadata entry 59(R)-8 which indicates that the data is stored in extent 50(R)-8 in persistent storage 44. As depicted, file B has N+1 logical blocks, mapped by mapping pointers 56B(0), . . . , 56B(N)).

As depicted, data segments 49(a) and 49(b) are both compressed data segments 49, which may hold a variable number of data extents 50 each, while data segment 49(R) is an uncompressed data segment 49 configured to hold a fixed number of data extents 50. In an example embodiment, an uncompressed data extent 50 is 8 kilobytes in length, and an uncompressed data segment 49 is sixty-four kilobytes long, capable of storing exactly 8 uncompressed data extents 50. Thus, compressed data segments 49(a) and 49(b) both store more than 8 compressed data extents 50 (i.e., P,Q>8). Each mapping metadata structure 58 contains exactly as many mapping metadata entries 59 as its corresponding data segment 49 contains data extents 50.

Figure 1B:
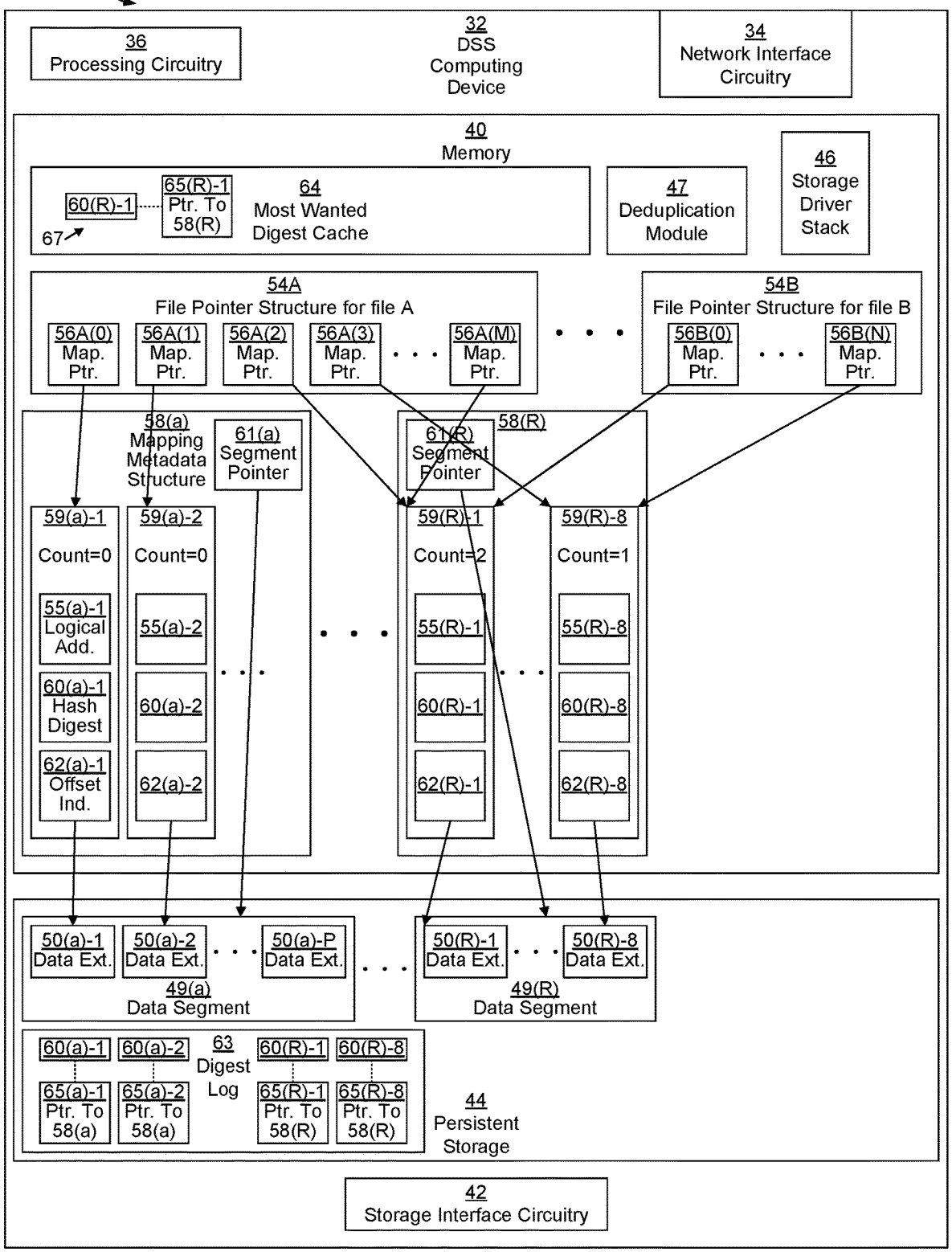
FIGS. 1B and 1C are block diagrams depicting the example apparatus from FIG. 1A with different example data structures used in connection with various embodiments.

It should be noted that, as depicted, hash digest 60(b)-1 is equal to hash digest 60(R)-8, hash digest 60(b)-Q is equal to hash digest 60(R)-1, and hash digest 60(a)-P is also equal to hash digest 60(R)-1. Thus, files A and B are suitable candidates for deduplication. Thus, at some point, deduplication module 47 (which may, in some embodiments, not depicted, be implemented as a module within storage driver stack 46) will perform a deduplication process to clear space. In some embodiments, this deduplication is performed as a background process. FIG. 1B depicts an example environment 30' that represents environment 30 but after a background deduplication process has been performed by deduplication module 47.

In example operation, the deduplication module 47 may first deduplicate file B (prior to deduplicating file A in this example). Thus, it begins at mapping pointer 56B(0) and follows it to mapping metadata entry 59(R)-1. It then reads hash digest 60(R)-1 and checks MWDC 64 within memory 40 for that hash digest 60(R)-1. Initially (see FIG. 1A), hash digest 60(R)-1 is not found in MWDC 64, so it proceeds to also check a digest log 63 in persistent storage 44 for that hash digest 60(R)-1. Initially (see FIG. 1A), hash digest 60(R)-1 is not found in digest log 63 either. Therefore, the deduplication module 47 adds (see FIG. 1B) hash digest 60(R)-1 to digest log 63 as an index and associates it with a pointer 65(R)-1 to mapping metadata structure 58(R), indicating that the hash digest 60(R)-1 may be found within mapping metadata structure 58(R). In some embodiments, pointer 65(R)-1 is more precise, pointing directly to mapping metadata entry 59(R)-1.

In some embodiments, prior to checking the digest log 63, deduplication module 47 may also check a temporal digest cache (not depicted) within memory 40 as described in co-pending U.S. patent application Ser. No. 15/668,388, filed Aug. 3, 2017, the contents and teachings of which are incorporated herein by this reference.

Deduplication module 47 then proceeds through file pointer structure 54B, ending with mapping pointer 56B(N). It follows mapping pointer 56B(N) to mapping metadata entry 59(R)-8. It then reads hash digest 60(R)-8 and checks MWDC 64 within memory 40 for that hash digest 60(R)-8. Initially (see FIG. 1A), hash digest 60(R)-8 is not found in MWDC 64, so it proceeds to also check digest log 63 in persistent storage 44 for that hash digest 60(R)-8. Initially (see FIG. 1A), hash digest 60(R)-8 is not found in digest log 63 either. Therefore, the deduplication module 47 adds (see FIG. 1B) hash digest 60(R)-8 to digest log 63 as an index and associates it with a pointer 65(R)-8 to mapping metadata structure 58(R), indicating that the hash digest 60(R)-8 may be found within mapping metadata structure 58(R). In some embodiments, pointer 65(R)-8 is more precise, pointing directly to mapping metadata entry 59(R)-8.

The deduplication module 47 may then proceed to file A. Thus, it begins at mapping pointer 56A(0) and follows it to mapping metadata entry 59($a$)-1. It then reads hash digest 60($a$)-1 and checks MWDC 64 within memory 40 for that hash digest 60($a$)-1. Initially (see FIG. 1A), hash digest 60($a$)-1 is not found in MWDC 64, so it proceeds to also check a digest log 63 in persistent storage 44 for that hash digest 60($a$)-1. Initially (see FIG. 1A), hash digest 60($a$)-1 is not found in digest log 63 either. Therefore, the deduplication module 47 adds (see FIG. 1B) hash digest 60($a$)-1 to digest log 63 as an index and associates it with a pointer 65($a$)-1 to mapping metadata structure 58($a$), indicating that the hash digest 60($a$)-1 may be found within mapping metadata structure 58($a$). In some embodiments, pointer 65($a$)-1 is more precise, pointing directly to mapping metadata entry 59($a$)-1.

The deduplication module 47 then proceeds through file pointer structure 54A, ending with mapping pointer 56A(M). It follows mapping pointer 56A(1) to mapping metadata entry 59($a$)-2. It then reads hash digest 60($a$)-2 and checks MWDC 64 within memory 40 for that hash digest 60($a$)-2. Initially (see FIG. 1A), hash digest 60($a$)-2 is not found in MWDC 64, so it proceeds to also check digest log 63 in persistent storage 44 for that hash digest 60($a$)-2. Initially (see FIG. 1A), hash digest 60($a$)-2 is not found in digest log 63 either. Therefore, the deduplication module 47 adds (see FIG. 1B) hash digest 60($a$)-2 to digest log 63 as an index and associates it with a pointer 65($a$)-2 to mapping metadata structure 58($a$), indicating that the hash digest 60($a$)-2 may be found within mapping metadata structure 58($a$). In some embodiments, pointer 65($a$)-2 is more precise, pointing directly to mapping metadata entry 59($a$)-2.

The deduplication module 47 then follows mapping pointer 56A(2) to mapping metadata entry 59($a$)-P. It then reads hash digest 60($a$)-P and checks MWDC 64 within memory 40 for that hash digest 60($a$)-P. Initially (see FIG. 1A), hash digest 60($a$)-P is not found in MWDC 64, so it proceeds to also check digest log 63 in persistent storage 44 for that hash digest 60($a$)-P. However, since hash digest 60($a$)-P is equal to hash digest 60(R)-1, which is already within the digest log 63 (see FIG. 1B), hash digest 60($a$)-P is found in digest log 63. Therefore, deduplication process 47 changes (see FIG. 1B) mapping pointer 56A(2) to instead point to mapping metadata entry 59(R)-1, allowing mapping metadata entry 59($a$)-P and data extent 50($a$)-P to be invalidated (and eventually freed, but typically not until the entire mapping metadata structure 58($a$) and segment 49($a$) have been invalidated, unless garbage collection is performed to defragment the mapping metadata structures 58 and segments 49). Deduplication module 47 may also indicate a count of deduplications thus far performed on mapping metadata entry 59(R)-1 to be 1 (instead of zero previously).

The deduplication module 47 then follows mapping pointer 56A(3) to mapping metadata entry 59($b$)-1. It then reads hash digest 60($b$)-1 and checks MWDC 64 within memory 40 for that hash digest 60($b$)-1. Initially (see FIG. 1A), hash digest 60($b$)-1 is not found in MWDC 64, so it proceeds to also check digest log 63 in persistent storage 44 for that hash digest 60($b$)-1. However, since hash digest 60($b$)-1 is equal to hash digest 60(R)-8, which is already within the digest log 63 (see FIG. 1B), hash digest 60($b$)-1 is found in digest log 63. Therefore, deduplication process 47 changes (see FIG. 1B) mapping pointer 56A(3) to instead point to mapping metadata entry 59(R)-8, allowing mapping metadata entry 59($b$)-1 and data extent 50($b$)-1 to be invalidated (and eventually freed, but typically not until the entire mapping metadata structure 58($b$) and segment 49($b$) have been invalidated, unless garbage collection is performed to defragment the mapping metadata structures 58 and segments 49). Deduplication module 47 may also indicate a count of deduplications thus far performed on mapping metadata entry 59(R)-8 to be 1 (instead of zero previously).

The deduplication module 47 then follows mapping pointer 56A(M) to mapping metadata entry 59($b$)-Q. It then reads hash digest 60($b$)-Q and checks MWDC 64 within memory 40 for that hash digest 60($b$)-Q. Initially (see FIG. 1A), hash digest 60($b$)-Q is not found in MWDC 64, so it proceeds to also check digest log 63 in persistent storage 44 for that hash digest 60($b$)-Q. However, since hash digest 60($b$)-Q is equal to hash digest 60(R)-1, which is already within the digest log 63 (see FIG. 1B), hash digest 60($b$)-Q is found in digest log 63. Therefore, deduplication process 47 changes (see FIG. 1B) mapping pointer 56A(M) to instead point to mapping metadata entry 59(R)-1, allowing mapping metadata entry 59($b$)-Q and data extent 50($b$)-Q to be invalidated (and eventually freed, but typically not until the entire mapping metadata structure 58($b$) and segment 49($b$) have been invalidated, unless garbage collection is performed to defragment the mapping metadata structures 58 and segments 49). Deduplication module 47 may also update a count of deduplications thus far performed on mapping metadata entry 59(R)-1 to be 2 (instead of 1 previously). At this point, because mapping metadata entry 59(R)-1 has been duplicated multiple times (in one embodiment, twice is enough, but in other embodiments, a higher threshold may be used), deduplication module 47 may place (see FIG. 1B) an entry 67 within MWDC 64 indexed by hash 60(R)-1 having pointer 65(R)-1 to mapping metadata structure 58(R), indicating that the hash digest 60(R)-1 may be found within mapping metadata structure 58(R). In some embodiments, pointer 65(R)-1 is more precise, pointing directly to mapping metadata entry 59(R)-1. This entry 67 may prove useful later (see FIG. 1C).

Figure 1C:
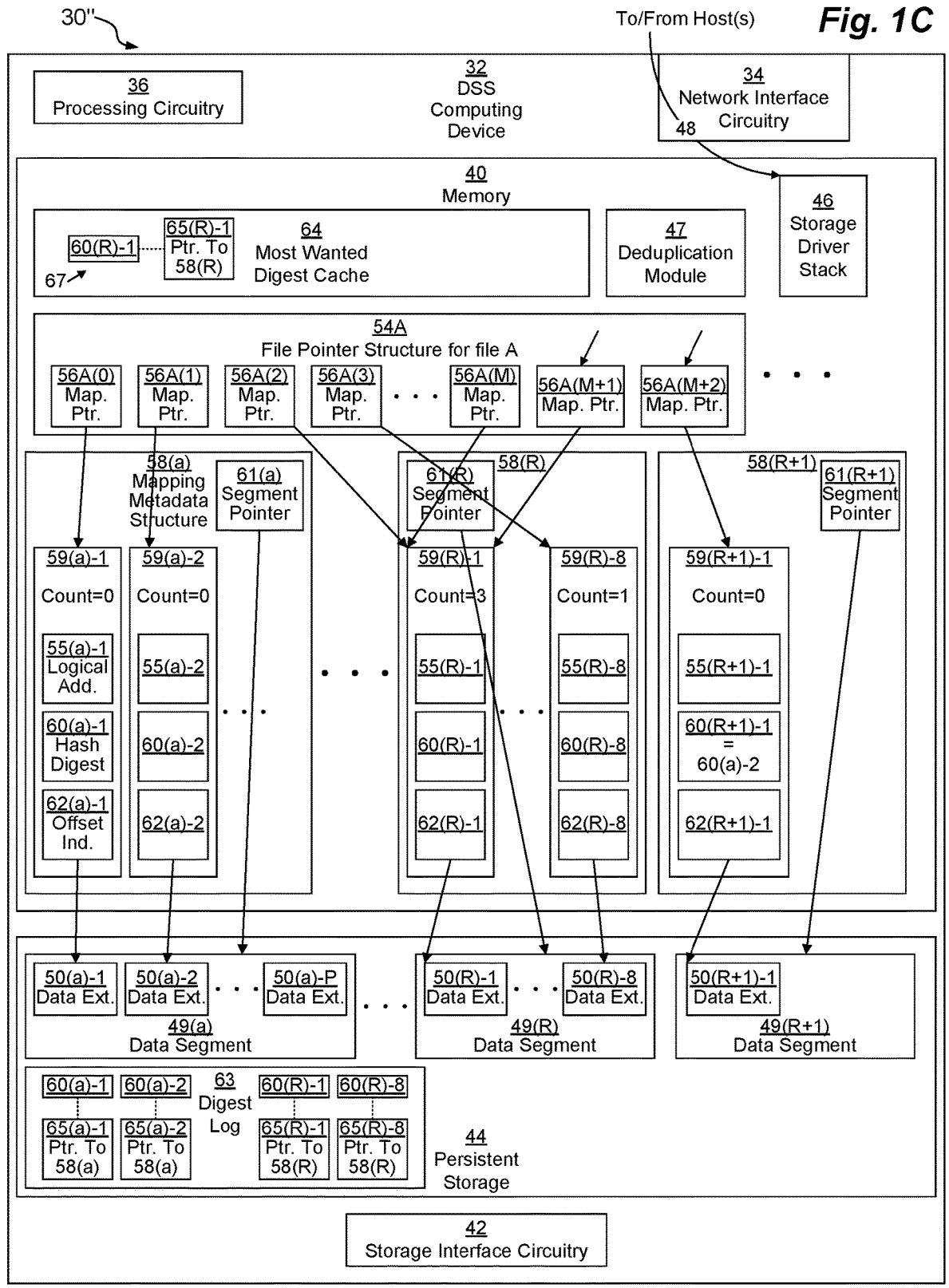

FIG. 1C depicts yet another arrangement 30" at a time after arrangement 30'. In arrangement 30", one or more WRITE data storage requests 48 have been received directed at addresses M+1 and M+2 of file A. The data to be written to address M+1 is immediately hashed, and, as it turns out, it hashes to be equal to hash 60(R)-1. Storage driver stack 46 immediately checks MWDC 64 for hash 60(R)-1. Since digest 60(R)-1 is indeed found within MWDC 64 associated with pointer 65(R)-1 that points to mapping metadata entry 59(R)-1, storage driver stack 46 may initiate in-line deduplication, calling upon deduplication module 47. Thus, the new data received for address M+1 is not actually written to persistent storage 44 at this time, but rather, mapping pointer 56A(M+1) is added to file pointer structure 54A, pointing to mapping metadata entry 59(R)-1. Deduplication module 47 may also update a count of deduplications thus far performed on mapping metadata entry 59(R)-1 to be 3 (instead of 2 previously).

In addition, the data to be written to address M+2 is also immediately hashed, and, as it turns out, its hash digest 60(R+1)-1 turns out to be equal to hash digest 60(a)-2. However, since hash digest 60(a)-2 is not yet in MWDC 64, storage driver stack 46 does not initiate in-line deduplication. Instead, storage driver stack 46 creates a new mapping metadata structure 58(R+1) with associated data segment 49(R+1) on persistent storage and inserts a new mapping metadata entry 59(R+1)-1 in that new mapping metadata structure 58(R+1) with hash digest 60(R+1)-1 and offset 62(R+1)-1 pointing to data extent 50(R+1)-1 on data segment 49(R+1). Storage driver stack 46 also adds mapping pointer 56A(M+2) to file pointer structure 54A, pointing to mapping metadata entry 59(R+1)-1. The data for address M+2 from the new WRITE data storage request 48 may also be written to data extent 50(R+1)-1, even though it is the same as the data of data extent 50(a)-2. This duplication may later be removed through background deduplication.

Figure 2:
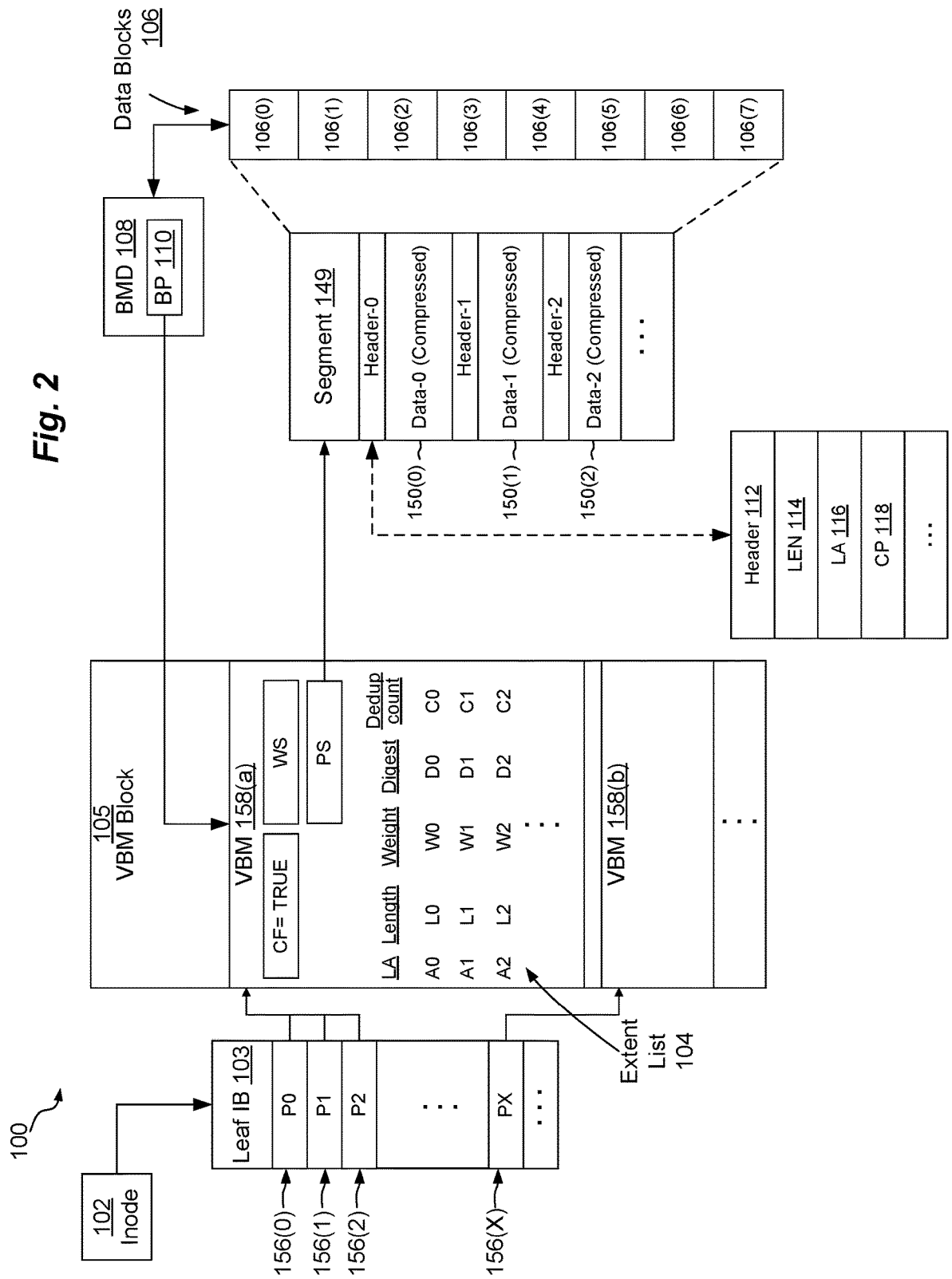
FIGS. 2 and 3 are block diagrams depicting example data structures used in connection with various embodiments.

FIG. 2 shows an example arrangement 100 of filesystem metadata structures in more detail. A filesystem pointer structure 54 includes an inode 102 of a file that points to a leaf indirect block (IB) 103. In some arrangements, inode 102 may also point to intermediate IBs (not depicted) that, in-turn, point to other leaf IMs 103. Leaf IB 103 includes mapping pointers 156 (which represent examples of mapping pointers 56), which map logical addresses of the file to corresponding physical addresses (FSBNs) in the filesystem. For example, mapping pointer 156(0) (pointer P0) maps logical address A0, mapping pointer 156(1) (pointer P1) maps logical address A1, and mapping pointer 156(2) (pointer P2) maps logical address A2. Each logical address (A0, A1, or A2) describes a block-sized increment of storage in the file, even though the underlying data may be compressed to much less than the size of a block. Each of these mapping pointers 156(0), 156(1), 156(2) points to a VBM 158(a), which is an example embodiment of a mapping metadata structure 58.

Leaf IB 103 may include additional mapping pointers 156 (e.g., a total of 9 or more, up to a maximum permitted number per segment 49, such as, for example, sixty-three) that all point to the same VBM 158(a) for addressing respective extents of compressed data in segment 149. Leaf IB 103 may also store additional mapping pointers, such as mapping pointer 156(X) (pointer PX), which point to other segments 49 via other VBMs such as VBM 158(b). Leaf IB 103 may include any number of mapping pointers 156, a typical number being 1024. In some arrangements, inode 102 may also include mapping pointers 156 as is well-known in the art, In the example shown, mapping pointers 156(0), 156(1), 156(2) in leaf IB 103 all point to compressed VBM 158(a). VBM 158(a) has a compression flag CF, a weight WS, and a pointer PS. The compression flag CF indicates whether or not VBM 158(a) represents compressed data, in this example indicating that it does. The weight WS indicates the total number of mapping pointers 156 that point to that VBM 158(a), and the pointer PS points to the physical address (FSBN) of the segment 149, which by convention may be selected to be the address of the first data block in segment 149, i.e., data block 106(0). The VBM 158(a) also has an extent list 104. Extent list 104 describes the contents of segment 149 and relates, for each extent of compressed data, the logical address (LA) of that item in the file (e.g., A0, A1, or A2), a length (L0, L1, or L2, e.g., in bytes or sectors) of that compressed data in the segment 149), a weight (W0, W1, or W2), and a digest 60 (e.g., D0, D1, or D2) of the contents of the extent 150. The weight A0, A1, A2 of each respective entry of the extent list 104 represents a number of mapping pointers 156 that point to that entry. The weight A0, A1, A2 may represent mapping pointers of both deduplicated blocks and snapshots of the file or filesystem that share some of its data. In some embodiments, each entry of the extent list 104 also includes a Dedup count C0, C1, C2, which represents the number of times that that entry has been deduplicated without including snapshots. In some embodiments, the Dedup counts C0, C1, C2 may include deduplication events that represent mapping pointers 156 that have since been deleted.

In an example, the sum of weights of extents in the extent list 104 equals the total weight WS of the VBM 158(a). The various entries in extent list 149 represent an embodiment of respective mapping metadata entries 59.

Segment 149 is composed of contiguous data blocks 106, i.e., blocks 106(0) through 106(7). For purposes of storing compressed data, boundaries between blocks 106(0) through 106(7) may be ignored and the segment 149 may be treated as one continuous space. Segment 149 is one embodiment of a segment 49, and extents 150 are one embodiment of extents 50.

In an example, segment 149 has associated per-block metadata (BMD) 108. By convention, the BMD 108 may be provided for the first block 106(0) in segment 149. The filesystem ensures that BMD 108 has a known location relative to block 106(0) and vice-versa, such that the location of one implies the location of the other. BMD 108 may also store a back-pointer 110 to the VBM 158(a), i.e., to the particular VBM 158(a) that maps the compressed data stored in segment 149.

The detail shown in segment 149 indicates an example layout of compressed extents 150. For instance, Header-0 can be found immediately before compressed Data-0 in extent 150(0). Likewise, Header-1 can be found immediately before compressed Data-1 in extent 150(1). Similarly, Header-2 can be found immediately before compressed Data-2 in extent 150(2).

A compression header 112 is shown for illustration and is intended to be representative of all compression headers in segment 149 (or in any segment 49). In an example, each compression header 112 is a fixed-size data structure that includes multiple data elements, such as the following:

LEN 114: the length of the corresponding extent of compressed data; e.g., in bytes.

LA 116: the logical address (e.g., A0, A1, or A2) of the corresponding extent of compressed data within the file.

CP 118: a compression procedure (or algorithm) used to compress the data, such as LZ-L3, LZH-L4, "Hardware," and so on.

The header 112 may also include additional elements, such as CRC (Cyclic Redundancy Check) and various flags.

VBM 158(a) and at least one other VBM 158(b) are both depicted as being contained within a single VBM block 105, which is a block (e.g., 8 kilobytes in size) that stores both VBMs 158(*a*), 158(*b*) together in persistent storage 44. The size of a VBM 158 can vary by embodiment, but, in one embodiment, a VBM block 105 may hold three or four compressed VBMs 158.

Figure 3:
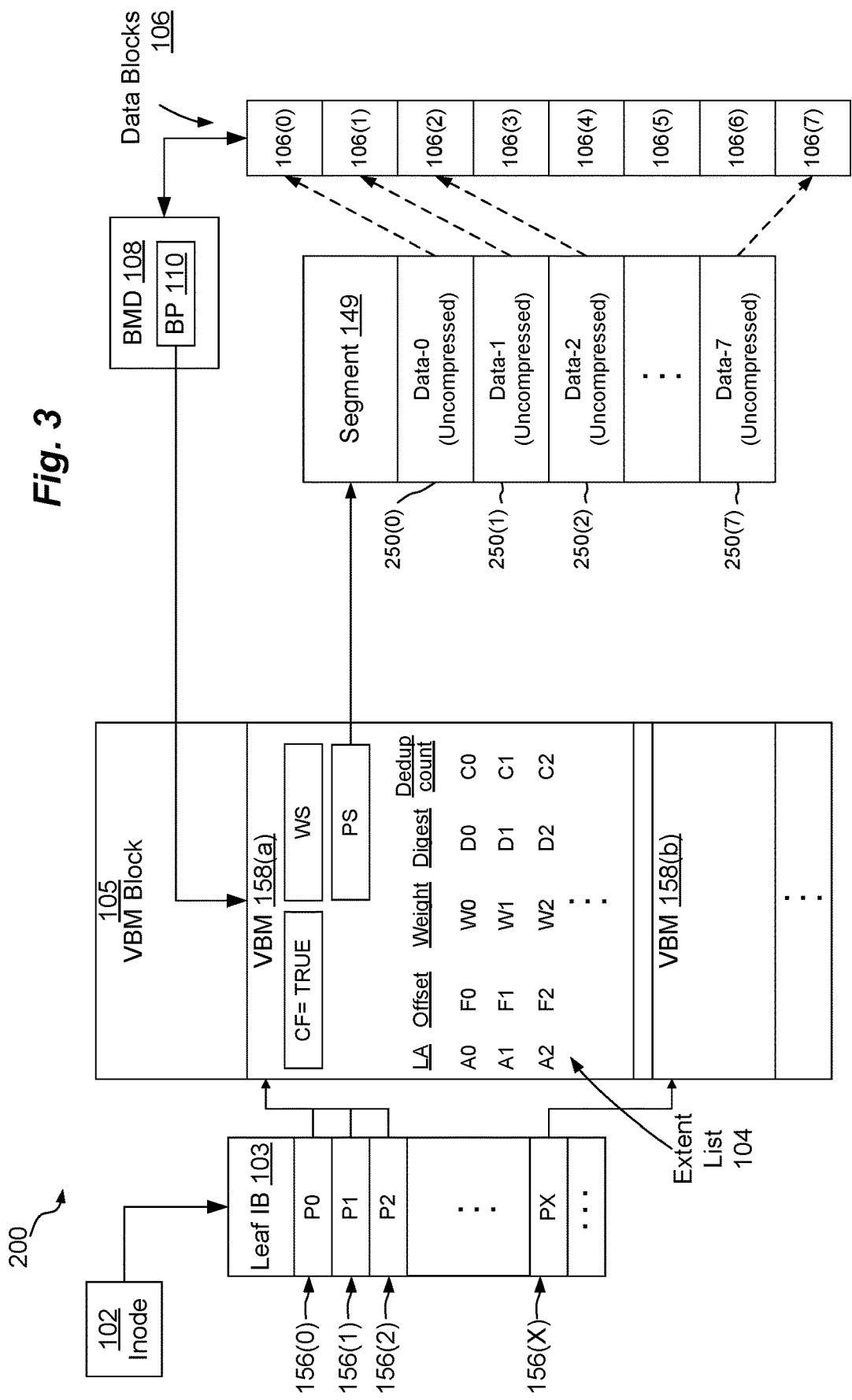

FIG. 3 shows another arrangement 200 similar to FIG. 2, but this time showing an uncompressed example. Thus, in arrangement 200, the compression flag CF is set to false indicating that no compression is used for VBM 158(*a*). In addition, since all extents are the same length when not compressed, there is no need to separately store the Length of each entry. Rather extent list 104 may instead store a block offset (e.g., F0, F1, or F2) within segment 149. Since each extent 250 is uncompressed, each extent 250 is stored entirely within a physical block 106 of the segment 149. Thus, segment 149 has no headers 112 in arrangement 200, and Data-0 of extent 150(0) is stored in physical block 106(0), Data-1 of extent 150(1) is stored in physical block 106(1), etc.

In one embodiment, a VBM block 105 may hold up to thirty-two uncompressed VBMs 158.

It should be understood that arrangements 100 and 200 may be combined. Thus, a given file may include some mapping pointers 156 to compressed extents 150 in a compressed VBM 158(*i*) as well as other mapping pointers 156 to uncompressed extents 250 in an uncompressed VBM 158(*j*).

FIG. 4 illustrates an example method 300 performed by storage driver stack 46 for ingesting data in accordance with various embodiments. It should be understood that any time a piece of software (e.g., storage driver stack 46 or deduplication module 47) is described as performing a method, process, step, or function, in actuality what is meant is that a computing device (e.g., DSS computing device 32) on which that piece of software is running performs the method, process, step, or function when executing that piece of software on its processing circuitry 36. It should be understood that one or more of the steps or sub-steps of method 300 may be omitted in some embodiments. Similarly, in some embodiments, one or more steps or sub-steps may be combined together or performed in a different order. Method 300 is performed by DSS computing device 32.

In step 310, storage stack 46 receives a data block for ingest. The data block is meant to be stored in persistent storage 44 and placed within a file of a filesystem. Step 310 may involve a WRITE storage request 48.

In step 320, storage driver stack 46 computes a hash digest 60 of the received data block using a pre-defined hashing algorithm.

In step 325, storage driver stack 46 looks up the hash digest 60 computed in step 320 within the MWDC 64 in memory 40. If there is an entry 67 corresponding to that hash digest 60, then operation proceeds with an in-line deduplication process 365 performed by deduplication module 47. Otherwise, operation proceeds with a storage of the data block without in-line deduplication beginning with step 330, although background deduplication will eventually be performed (see step 360).

In step 330, storage driver stack 46 stores the data block within persistent storage 44 as a data extent 50 within a particular data segment 49. In some arrangements, step 330 is accomplished by performing sub-step 332. In sub-step 332, storage driver stack 46 stores the received data block directly within persistent storage 44 as an uncompressed data extent 250 which takes up one block within an uncompressed data segment 49. Alternatively, in step 334, storage driver stack 46 compresses the received data block and stores the compressed result within persistent storage 44 as a compressed data extent 150, which is smaller than a block, within a compressed segment 49.

In step 340, if a mapping metadata structure 58 (such as a VBM 158) does not already exist for the segment 49 written to in step 330, then storage driver stack 46 creates a mapping metadata structure 58 (such as a VBM 158) for that segment 49. This may include setting the compressed flag CF to TRUE or FALSE (as appropriate) and setting the pointer PS to point to the segment 49 (or its first block 106(0)).

In step 345, storage driver stack 46 stores an indication of the offset of the extent 50 within the segment 49, the computed hash digest 60, an initial weight (e.g., 1) and the logical address LA of the block within the file or filesystem within a mapping metadata entry 59 of the mapping metadata structure 58 that corresponds to the extent 50 written in step 330. In the compressed case, the indication of the offset of the extent 50 within the segment 49 is based on the sum of the lengths of the previous extents in the extent list 104, while in the uncompressed case, the indication of the offset of the extent 50 within the segment 49 may be based on the position within the extent list 104 or based on the stored offset for the entry within the extent list 104. In some embodiments, storage driver stack 46 also initially sets the Dedup count to zero, since no deduplication has yet been performed on this newly-written block. In addition, storage driver stack 46 updates the weight WS of the VBM 158 by incrementing it by one.

In step 350, storage driver stack 46 stores a mapping pointer 56 within the appropriate location of the file pointer structure 54 (e.g., within inode 102 or leaf IB 104) that points to the mapping metadata entry 59 (or, in some embodiments, to the entire mapping metadata structure 58, since the logical address is stored within each entry of the extent list 104).

It should be understood that, although depicted in order, steps 330, 340, 345, and 350 may be performed in any order, except that optional step 340 must logically be performed prior to step 345 if step 340 is needed.

Finally, in step 360, storage driver stack 46 perform a background deduplication process based on the hash digests 60 so that mapping pointers 56 that point to mapping data entries 59 with equal hash digests 60 are assigned to both point to the same mapping data entry 59 and redundant data extents 50 in persistent storage 44 are removed (or never written to persistent storage 44 to begin with if they are still in a write cache waiting to be flushed). It should be noted that steps 330-350 may be performed for many different data blocks before the background deduplication of step 360 is performed on all of those blocks. See below in connection with FIG. 5 for more detail of an example embodiment of this background deduplication.

In-line deduplication process 365 includes steps 370-390. It should be understood that, although depicted in order, steps 370-390 may be performed in any order.

In step 370, deduplication module 47 loads into memory 40 (if it is not already loaded) the mapping metadata structure 58(U) (e.g., VBM 158(U)) that is pointed to by the pointer 65(U)-V within the entry 67 of MWDC 64 that is indexed by the hash digest 60(U)-V that was computed in step 320 and looked up in step 325.

In step 375, deduplication module 47 copies the pointer 65(U)-V and stores it as a mapping pointer 56 within the appropriate location of the file pointer structure 54 (e.g., within inode 102 or leaf IB 104) that points to the mapping metadata entry 59(U)-V (or, in some embodiments, to the entire mapping metadata structure 58(U), since the logical address is stored within each entry of the extent list 104) for that logical address of the file.

In step 380, deduplication module 47 updates the weight of the mapping metadata entry 59(U)-V (e.g., the weight of the appropriate entry on the extent list 104) (and the weight WS of the VBM 158(U)), incrementing it by one to reflect the fact that it is now pointed to by one new mapping pointer 56. In some embodiments, deduplication module 47 also updates the Dedup count of the mapping metadata entry 59(U)-V (e.g., the Dedup count of the appropriate entry on the extent list 104), incrementing it by one to reflect the fact that it has now been subject to deduplication one additional time.

In step 390, deduplication module 47 updates an ordering of entries 67 within the MWDC 64, increasing a priority of the entry 67 that was just accessed so that it does not soon age out of the MWDC 64. See below in connection with FIGS. 6B and 7 for more details.

FIG. 5 illustrates an example method 400 performed by deduplication module 47 for implementing deduplication process 360 in accordance with various embodiments. It should be understood that one or more of the steps or sub-steps of method 400 may be omitted in some embodiments. Similarly, in some embodiments, one or more steps or sub-steps may be combined together or performed in a different order. Method 400 is performed by DSS computing device 32.

Method 400 may be performed for each mapping metadata entry 59 that has not yet had deduplication run. In some embodiments, this may be accomplished by iterating through and following all the mapping pointers 56 in all file pointer structures 54, except for those mapping pointers 56 that have had a flag (not depicted) set indicating that deduplication has already been performed. In other embodiments, this is accomplished by iterating through all mapping metadata structures 58 that have been added or modified since deduplication was last performed.

In step 410, deduplication module 47 retrieves a hash digest 60(U)-V for a particular mapping metadata entry 59(U)-V in memory 40 that has not yet been deduplicated.

In step 420, deduplication module 47 looks up the retrieved hash digest 60(U)-V within MWDC 64 in memory 40. If an entry 67 indexed by that hash digest 60(U)-V is found there, then operation proceeds with step 450, otherwise operation proceeds with step 430.

In step 430, deduplication module 47 looks up the retrieved hash digest 60(U)-V within digest log 63 in persistent storage 44. If it is found there, then operation proceeds with step 450, otherwise operation proceeds with step 440.

In step 440, deduplication has not yet been performed on any block having a hash digest 60 equal to the retrieved hash digest 60(U)-V. Thus, deduplication module 47 creates a new entry within digest log 63 in persistent storage 44 indexed by the hash digest 60(U)-V with a pointer 65(U)-V that points to the mapping metadata structure 58(U) (or, in some embodiments, more particularly, to the mapping metadata entry 58(U)-V). At this point, method 400 terminates and it may be performed again on a new mapping metadata entry 59 (e.g., mapping metadata entry 59(U)-V+1 or 59(U+1)-1 or some other mapping metadata entry 59).

In step 450, deduplication module 47 loads the mapping metadata structure 58(W) pointed to by the hash digest 60(U)-V index from the MWDC 64 (if proceeding directly from step 420) or from the persistent digest log 63 (if proceeding in response to step 430) into a VBM cache (not depicted) within memory 40 if it is not already there.

In step 460, deduplication module 47 copies the pointer 65(W)-Y from the entry 64 located within the MWDC 64 in step 420 (or from the entry located within the persistent digest log 63 located in step 430) and stores it as a mapping pointer 56 within the appropriate location of the file pointer structure 54 (e.g., within inode 102 or leaf IB 104) pointing to the mapping metadata entry 59(W)-Y (or, in some embodiments, to the entire mapping metadata structure 58(W), since the logical address is stored within each entry of the extent list 104) for that logical address of the file, replacing the mapping pointer 56 that was previously stored in that location of the file pointer structure 54 (which used to point to mapping metadata entry 59(U)-V or mapping metadata structure 58(U)).

In step 465, deduplication module 47 updates the weight of the mapping metadata entry 59(W)-Y (e.g., the weight of the appropriate entry on the extent list 104) (and the weight WS of the VBM 158(W)), incrementing it by one to reflect the fact that it is now pointed to by one new mapping pointer 56. In some embodiments, deduplication module 47 also updates the Dedup count of the mapping metadata entry 59(W)-Y (e.g., the Dedup count of the appropriate entry on the extent list 104), incrementing it by one to reflect the fact that it has now been subject to deduplication one additional time.

In step 470, if the weight of the original mapping metadata entry 59(U)-V has decreased to zero, then that mapping metadata entry 59(U)-V (and its corresponding data extent 50(U)-V) may be invalidated. In some embodiments, that mapping metadata entry 59(U)-V (and, if it is uncompressed, its corresponding data extent 50(U)-V) may be freed for reuse. In addition, if the weight WS of the mapping metadata structure 58(U) has decreased to zero, then that mapping metadata structure 58(U) and its corresponding data segment 49(U) may be invalidated and freed for reuse.

Operation proceeds with step 475 if the hash digest 60(U)-V was found within MWDC 64 in memory 40 in step 420. In step 475, deduplication module 47 updates an ordering of entries 67 within the MWDC 64, increasing a priority of the entry 67 that was just accessed so that it does not soon age out of the MWDC 64. See below in connection with FIGS. 6B and 7 for more details.

Alternatively, if the hash digest 60(U)-V was not found within MWDC 64 in memory 40 in step 420, operation proceeds with step 480. In step 480, deduplication module 47 determines whether or not the weight (or, in some embodiments, the Dedup count) of the mapping metadata entry 59(W)-Y (e.g., the weight or Dedup count of the appropriate entry on the extent list 104) now exceeds an entry threshold, the entry threshold determining how "popular" a hash digest 60 must be to be placed into the MWDC 64. In one embodiment, the entry threshold 64 has a value of two, meaning that once a Mapping Metadata entry 59(W)-Y has been deduplicated twice, a pointer 65(W)-Y to that Mapping Metadata entry 59(W)-Y (or, in some embodiments, to the Mapping Metadata structure 59(W)) is added to a new entry 67 on the MWDC 64 indexed by its corresponding hash digest 60(W)-Y. In other embodiments, a larger entry threshold may be used, such as, for example, a value of ten or twenty. If step 480 yields an affirmative result, then operation proceeds with step 485. Otherwise, method 400 terminates and it may be performed again on a new mapping metadata entry 59 (e.g., mapping metadata entry 59(U)-V+1 or 59(U+1)-1 or some other mapping metadata entry 59).

In step 485, deduplication module 47 adds a new entry 67 to the head of the MWDC 64 indexed by the hash digest 60(W)-Y, the entry 67 having a pointer 65(W)-Y to the Mapping Metadata entry 59(W)-Y (or, in some embodiments, to the Mapping Metadata structure 59(W)). Adding to the head of the MWDC 64 refers to a linked list structure that indicates that that entry 67 was most recently used (MRU). In some embodiments, the new entry 67 is added to the head of a lower level of the MWDC 64 (see below in connection with FIG. 6B). In some embodiments, the hash digest 60(W)-Y is used together with a filesystem identifier to key into the MWDC 64 to prevent deduplication from sharing blocks between different filesystems.

After step 485, in step 490, deduplication module 47 removes a least recently used (LRU) entry 67 from the (lower level of) the MWDC 64 (see below in connection with FIG. 6B) if the MWDC 64 is too full, i.e., if it stores more than a threshold maximum number of entries 67. In one embodiment, MWDC 64 is configured to take up up to 20 megabytes of space in memory 40. Thus, for example, if each entry is 64 bytes long, the threshold maximum number of entries in MWDC 64 would be 327,680.

Figure 6A:
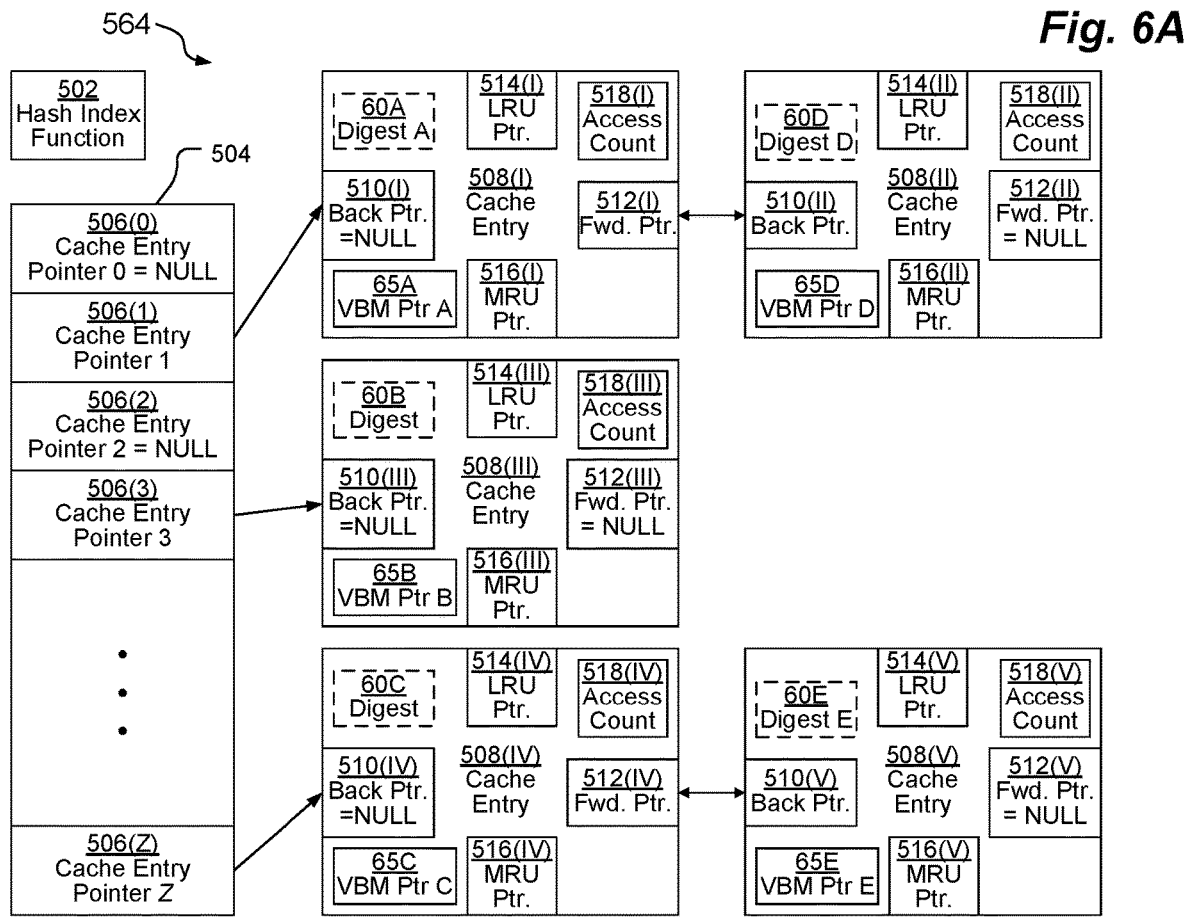
FIGS. 6A and 6B are block diagrams depicting different views of an example Most Wanted Digest Cache according to various embodiments.
Figure 6B:
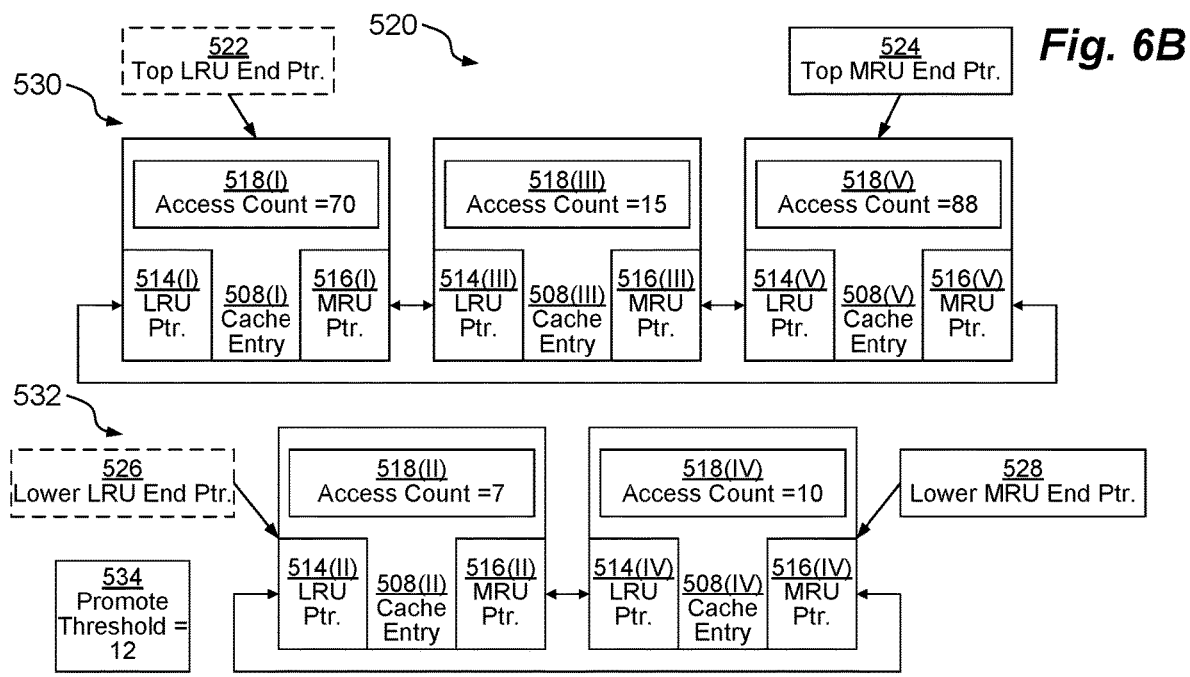

FIG. 6A depicts an example MWDC 564 according to some embodiments. MWDC 264 includes a hash index function 502 which is configured to receive a hash digest 60 (and, in some embodiments, a filesystem identifier) as an input and to output an index within the range of zero to Z for some integer Z (e.g., Z=1000). Hash index function 502 is designed to evenly distribute all possible hash digests 60 (e.g., ranging from zero to $2^{256}-1$) (combined with all possible filesystem identifiers) into Z+1 bins. The output of hash index function 502 is used as an index into an array 504 of cache entry pointers 506 (depicted as cache entry pointers 506(0), 506(1), 506(2), 506(3), . . . , 506(Z)), which may be sparsely populated. Thus, as depicted, many of the cache entry pointers 506 have NULL values. Other cache entry pointers 506(1), 506(3), 506(R) point to cache entries 508, which may be arranged in linked lists.

Each cache entry 508 includes a VBM pointer 65 and an access count 518. In addition, in some embodiments, each cache entry 508 includes a hash digest 60. As depicted, cache entry 508(I) has hash digest 60A, VBM pointer 65A (which points to mapping metadata entry 59A), and access count 518(I); cache entry 508(II) has hash digest 60D VBM pointer 65D (which points to mapping metadata entry 59D), and access count 518(II); cache entry 508(III) has hash digest 60B, VBM pointer 65B (which points to mapping metadata entry 59B), and read hit count 518(III); cache entry 508(IV) has hash digest 60C, VBM pointer 65C (which points to mapping metadata entry 59C), and read hit count 518(IV); and cache entry 508(V) has hash digest 60E, VBM pointer 65E (which points to mapping metadata entry 59E), and read hit count 518(V).

Each cache entry 508 may also store a back pointer 510 and a forward pointer 512 to effectuate a linked list structure for each bin associated with each respective cache entry pointer 506 (although, in some embodiments, only a forward pointer 512 is used, thereby effectuating only a single-linked list rather than a doubly-linked list). As depicted, cache entry pointer 506(1) points to a linked list having cached entries 508(I), 508(II). Cached entry 508(I) has a NULL back pointer 510(I) indicating that it is the first cached entry 508 in the linked list of the bin of cache entry pointer 506(I). Cached entry 508(I) also has a forward pointer 512(I) that points to the next cached entry 508(II) in the linked list of the bin of cache entry pointer 506(1). Cached entry 508(II) has a back pointer 510(II) that points to the previous cached entry 508(I) in the linked list of the bin of cache entry pointer 506(1). Cached entry 508(II) also has a NULL forward pointer 512(II) indicating that it is the last cached entry 508 in the linked list of the bin of cache entry pointer 506(1).

As depicted, cache entry pointer 406(3) points to a linked list having only a single cached entry 508(III). Cached entry 508(III) has a NULL back pointer 510(III) indicating that it is the first cached entry 508 in the linked list of the bin of cache entry pointer 506(3). Cached entry 508(III) also has a NULL forward pointer 512(III) indicating that it is the last cached entry 508 in the linked list of the bin of cache entry pointer 506(3).

As depicted, cache entry pointer 506(Z) points to a linked list having cached entries 508(IV), 508(V). Cached entry 508(IV) has a NULL back pointer 510(IV) indicating that it is the first cached entry 508 in the linked list of the bin of cache entry pointer 506(Z). Cached entry 508(IV) also has a forward pointer 512(IV) that points to the next cached entry 508(V) in the linked list of the bin of cache entry pointer 506(Z). Cached entry 508(V) has a back pointer 510(V) that points to the previous cached entry 508(IV) in the linked list of the bin of cache entry pointer 506(Z). Cached entry 508(V) also has a NULL forward pointer 512(V) indicating that it is the last cached entry 508 in the linked list of the bin of cache entry pointer 506(Z).

Each cache entry 508 may also store a least-recently-used (LRU) pointer 514 and a most-recently-used (MRU) pointer 516 to effectuate a linked list structure for deciding which cache entry 508 to evict from the content-based cache 564 when room must be made for a new cache entry 508. See FIG. 6B for a clearer view of this eviction linked list structure 520, which may be implemented as a multi-level structure having a top linked list 530 and a lower linked list 532. In this multi-level structure, cache entries 508 are first inserted into the lower linked list 532 and then promoted to the top linked list 530 once accessed frequently enough. This allows cache entries 508 indexed by hash digests 60 that are not actually very popular to quickly age out of the MWDC 64 by remaining on the lower linked list 532, which is typically smaller than the top linked list 530. This makes room in the MWDC 64 for newly-popular digests 60 while also keeping older cache entries 508 that remain commonly-deduped, even while less popular cache entries 508 are evicted. This is because the MWDC 64 is limited to a maximum size (e.g., 20 megabytes) in order to conserve space within memory 40. It should be understood that this two level structure is by way of example only—the MWDC 64 may also be implemented with a single-level structure or with more than two levels.

A top LRU end pointer 522 may point to a first cache entry 508(I) at a least-recently-used (head) end of the top linked list 530, while top MRU end pointer 524 points to a last cache entry 508(V) at a most-recently-used (tail) end of the top linked list 530. In some embodiments, top linked list 530 is implemented as a circular linked list and the top LRU end pointer 522 may be omitted.

As depicted, cached entry 508(I) has an LRU pointer 514(I) that points to head cache entry 508(V), indicating that cached entry 508(I) is the least-recently accessed cached entry 508 in the top linked list 530. Cached entry 508(I) also has an MRU pointer 516(I) that points to the next cached entry 508(III) in the top linked list 530. Cached entry 508(III) has an LRU pointer 514(III) that points to the previous cached entry 508(I) in the top linked list 530. Cached entry 508(III) also has an MRU pointer 516(III) that points to the next cached entry 508(V) in the top linked list 530. Cached entry 508(V) has an LRU pointer 514(V) that points to the previous cached entry 508(III) in the top linked list 530. Cached entry 508(V), which is positioned at the head of the top linked list 530, also has an MRU pointer 516(V) that points to the tail entry of the top linked list 530.

A lower LRU end pointer 526 may point to a first cache entry 508(II) at a least-recently-used (head) end of the lower linked list 532, while lower MRU end pointer 528 points to a last cache entry 508(IV) at a most-recently-used (tail) end of the lower linked list 532. In some embodiments, lower linked list 532 is implemented as a circular linked list and the lower LRU end pointer 526 may be omitted.

As depicted, cached entry 508(II) has an LRU pointer 514(II) that points to head cache entry 508(IV), indicating that cached entry 508(II) is the least-recently accessed cached entry 508 in the lower linked list 532. Cached entry 508(II) also has an MRU pointer 516(II) that points to the next cached entry 508(IV) in the lower linked list 532. Cached entry 508(IV) has an LRU pointer 514(IV) that points to the previous cached entry 508(II) in the lower linked list 532. Cached entry 508(IV), which is positioned at the head of the lower linked list 532, also has an MRU pointer 516(V) that points to the tail entry of the lower linked list 532.

The lower linked list 532 and the top linked list 530 of the eviction linked list structure 520 is sorted such that infrequently-accessed cache entries 508 are pushed to the tail ends of their respective linked lists 532, 530, after which they age off those respective lists 532, 530. Upon aging off of the top linked list 532, a cache entry 508 is moved to head of the lower linked list 532. Upon aging off of the lower linked list 532, a cache entry 508 is removed entirely from the MWDC 564.

A cache entry 508(X) may be promoted from the lower linked list 532 to the top linked list 530 if its access count 518(X) exceeds a promote threshold 534. As depicted, the promote threshold 534 is 12, meaning that once a cache entry 508(X) has been accessed 12 times, it is promoted to the top linked list 530 (although it may still age off of that list 530). The promote threshold 534 may be any value equal to one or greater, depending on the embodiment. In some embodiments, the promote threshold 534 may by dynamically-adjusted. In some embodiments, every time a cache entry 508(X) of the MWDC 64 is accessed (in step 325 or 420), deduplication module 47 increments its respective access count 518(X). In other embodiments, the access count 518(X) is no longer modified once the cache entry 508(X) is promoted to the top linked list 530. In some embodiments, when a cache entry 508(X) is demoted from the top linked list 530 to the lower linked list 532, its respective access count 518(X) may be reset to zero or some other value between zero and the promote threshold 534.

In some embodiments, instead of basing promotion decisions on the access count 518(X) of any given cache entry 508(X), deduplication module 47 may compare the weight or Dedup count of the mapping metadata entry 59 pointed to by the VBM pointer 65 of that cache entry 508(X) to the promote threshold 534.

In one embodiment, MWDC 564 is configured to have a maximum length of 327,680 cache entries 508 and the top linked list 530 is configured to have a maximum length of 250,000 cache entries, although this is by way of example only. Typically, when the top linked list 530 is at is maximum length, the lower linked list 532 will be significantly smaller than the top linked list 530.

Figure 7:
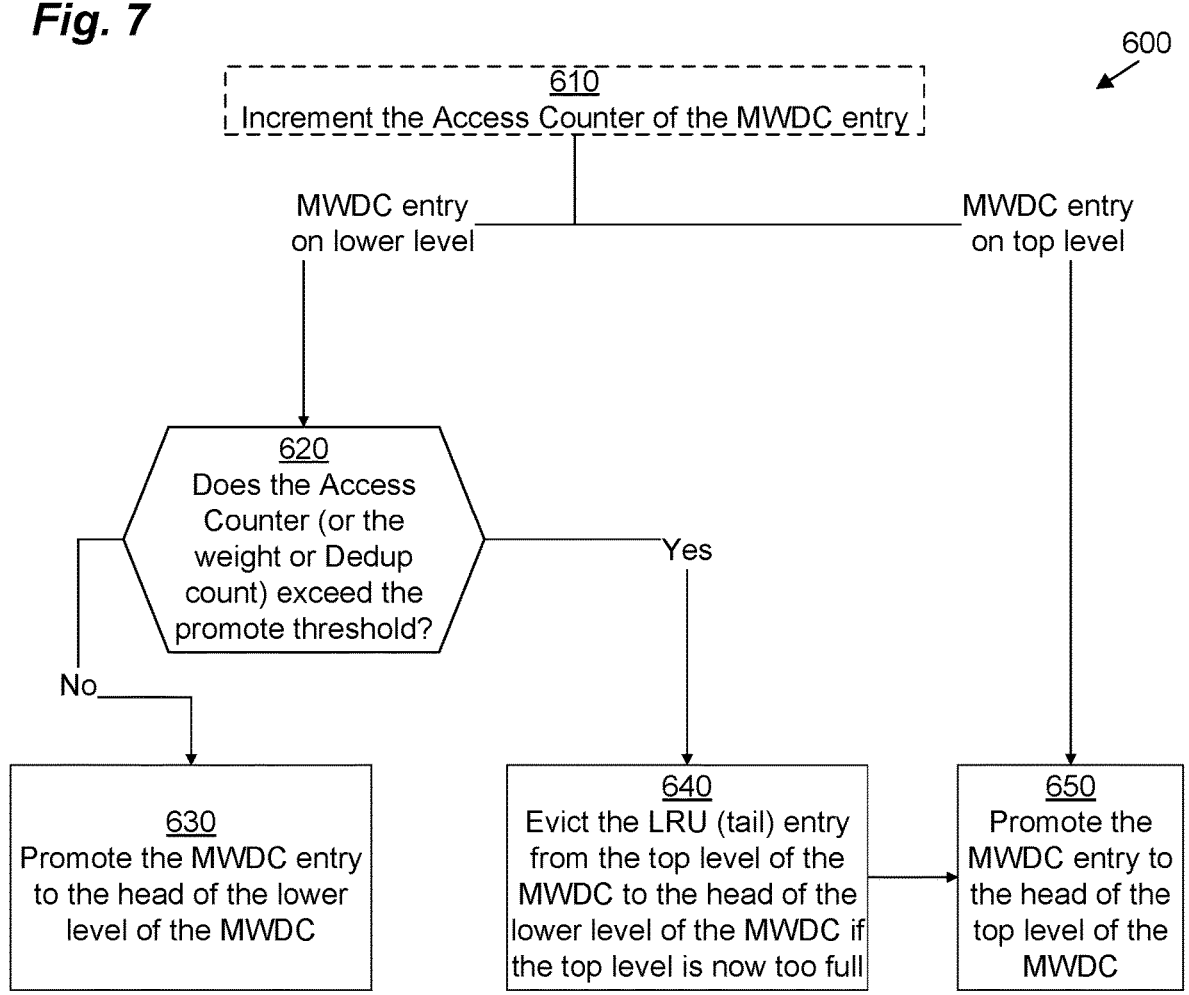
FIG. 7 is a flowchart depicting example methods of various embodiments.

FIG. 7 illustrates an example method 600 performed by deduplication module 47 for implementing steps 390 and 475 in accordance with various embodiments. It should be understood that one or more of the steps or sub-steps of method 600 may be omitted in some embodiments. Similarly, in some embodiments, one or more steps or sub-steps may be combined together or performed in a different order. Method 700 is performed by DSS computing device 32.

In step 610, in embodiments in which the access count 518 is used, deduplication module 47 increments the access count 518(X) of the particular cache entry 508(X) for which a respective mapping metadata entry 59 pointed to by its respective VBM pointer 65 (e.g., for cache entry 508(IV), the mapping metadata entry 59 pointed to by VBM pointer 65C) was just updated (in step 380 of method 300 or in step 465 of method 400).

If the cache entry 508(X) is on the lower level 532, then operation proceeds with step 620, otherwise operation proceeds with step 650.

In step 620, deduplication module 47 determines whether or not the access count 518(X) of the cache entry 508(X) now exceeds the promote threshold 534. In some embodiments, instead of looking at the access count 518(X) of the cache entry 508(X), deduplication module 47 looks to the weight or Dedup count of the mapping metadata entry 59 mapped to by the VBM pointer 65 of the cache entry 508(X). If step 620 yields a negative result, operation proceeds with step 630. Otherwise, operation proceeds with step 640.

In step 630, deduplication module 47 promotes the cache entry 508(X) to the head of the lower level linked list 532. This may involve accessing the cache entry 508(H) pointed to by the lower MRU end pointer 528, resetting its MRU pointer 516(H) to point to the cache entry 508(X), and resetting the lower MRU end pointer 528 to instead point to the cache entry 518(X). Of course it should be understood that additional pointers 514, 516, 526 may also need to be modified for consistency.

In step 640, if the top level linked list 530 is already at its maximum size, deduplication module 47 evicts a cache entry 508(T) from the tail of the top level linked list 530, instead moving it to the head of the lower level linked list 532. Operation then proceeds with step 650.

In step 650, deduplication module 47 promotes the cache entry 508(X) to the head of the top level linked list 530 (either from elsewhere within the top level linked list 530, or, if done following step 620, from the lower level linked list 532). This may involve accessing the cache entry 508(J) pointed to by the top MRU end pointer 524, resetting its MRU pointer 516(J) to point to the cache entry 508(X), and resetting the top MRU end pointer 524 to instead point to the cache entry 518(X). Of course it should be understood that additional pointers 514, 516, 526 may also need to be modified for consistency.

Although step 640 is depicted as preceding step 650, in some embodiments, following an affirmative result from step 620, step 650 may instead precede step 640.

It should be understood that although described in the context of deduplication, in some embodiments, the MWDC 64 may also be used to improve read cache performance. Thus, once a threshold number of read commands access any given data block that is pointed to by a mapping metadata entry 59 that is pointed to by the MWDC 64, the contents of that data block may become cached within memory 40.

Thus, techniques have been presented for implementing a deduplication system that minimizes disk accesses to an on-disk digest log 63 when deduplicating popular data blocks. Some embodiments are directed to techniques that further allow deduplication to be performed in-line (process 365) under certain conditions (i.e., an affirmative result from step 325). In contrast with prior approaches, improved techniques for performing deduplication utilize an most wanted digest cache 64, 564 stored in memory 40. When it is determined that a particular block of data has been deduplicated frequently enough (e.g., more than a threshold number of times), an entry 67, 508 for that block is added into the most wanted digest cache 64, 564 so that time-consuming access to the on-disk digest log 63 may be avoided in the future. Because popular blocks can now be deduplicated without having to access the on-disk digest log 63, these popular blocks can be deduplicated in-line as soon as they are ingested.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method, performed by a computing device, of performing deduplication of data stored on the computing device, the method comprising:

obtaining a digest of a data block logically-positioned within a filesystem managed by the computing device, the digest providing a hash value of data of the data block;

searching a Most Wanted Digest Cache (MWDC) within system memory of the computing device for the digest;

locating an entry in the MWDC within system memory using the digest, wherein this locating indicates that the data block has the same data as another data block located elsewhere within the filesystem, the other data block having been previously persistently-stored by the computing device, the entry having been added to the MWDC in response to the other data block having been deduplicated at least a plural number of times;

locating a mapping structure referenced by the entry located from the MWDC, the mapping structure providing metadata about the other data block;

deduplicating the data block and the other data block with reference to the located mapping structure; and performing a preliminary deduplication of the other data block by:

reading a digest (hereinafter "third digest") of yet another (hereinafter "third") data block from yet another (hereinafter "third") mapping structure, the third digest providing a hash value of data of the third data block, the third data block already being stored at a first address of persistent storage different than a second address of persistent storage where the other data block is stored, the third data block being pointed to by the third mapping structure;

searching the MWDC within system memory of the computing device for the third digest;

in response to failing to find the third digest in the MWDC, obtaining a persistent entry from a persistent digest log stored in secondary storage of the computing device using the digest of the third data block, wherein this obtaining indicates that the third data block has the same data as the other data block, the other data block having been previously persistently-stored by the computing device, the persistent entry having been added to the persistent digest log in response to the other data block having been analyzed by a background deduplication process;

locating the mapping structure of the other data block as referenced by the persistent entry obtained from the persistent digest log;

determining a popularity value of the other data block and comparing the popularity value to the plural number of times;

in response to the popularity value of the other data block being at least the plural number of times, creating the entry in the MWDC indexed by the digest and inserting a reference to the mapping structure within the entry in the MWDC; and deduplicating the third data block and the other data block with reference to the located mapping structure.

2. The method of claim 1, wherein obtaining the digest is performed in response to receiving a write request to write the data block to the filesystem on the computing device, the write request including data of the data block; and wherein obtaining the digest includes applying a cryptographic hashing algorithm to the data of the data block.

3. The method of claim 2 wherein deduplicating the data block and the other data block with reference to the located mapping structure includes:

storing a reference to the mapping structure at a location within a file pointer structure of a file of the filesystem that corresponds to a location within the file where the data block is logically-positioned; and increasing a weight stored within the mapping structure to indicate that the other data block is now shared an additional time, the weight indicating how many locations within the filesystem share the other data block.

4. The method of claim 3 wherein deduplicating the data block and the other data block with reference to the located mapping structure further includes increasing a deduplication counter stored within the mapping structure to indicate that the other data block has been deduplicated an additional time, the deduplication counter indicating how many times the other data block has been deduplicated.

5. The method of claim 1,
wherein obtaining the digest is performed as part of a background deduplication process, the data block already being stored at a first address of persistent storage different than a second address of persistent storage where the other data block is stored, the data block being pointed to by another mapping structure, the other mapping structure being referenced by a mapping pointer at a location within a file pointer structure of a file of the filesystem that corresponds to a location within the file where the data block is logically-positioned; and
wherein obtaining the digest includes reading the digest from the other mapping structure.

6. The method of claim 5 wherein deduplicating the data block and the other data block with reference to the located mapping structure includes:
storing a reference to the mapping structure at the location within the file pointer structure of the file of the filesystem that corresponds to the location within the file where the data block is logically-positioned in place of the mapping pointer that referenced the other mapping structure; and
increasing a weight stored within the mapping structure to indicate that the other data block is now shared an additional time, the weight indicating how many locations within the filesystem share the other data block.

7. The method of claim 6 wherein deduplicating the data block and the other data block with reference to the located mapping structure further includes increasing a deduplication counter stored within the mapping structure to indicate that the other data block has been deduplicated an additional time, the deduplication counter indicating how many times the other data block has been deduplicated.

8. The method of claim 1 wherein determining the popularity value of the other data block includes reading a weight value stored within the mapping structure, the weight value indicating how many locations within the filesystem share the other data block.

9. The method of claim 1 wherein determining the popularity value of the other data block includes reading a deduplication counter stored within the mapping structure, the deduplication counter indicating how many times the other data block has been deduplicated.

10. The method of claim 1 wherein performing the preliminary deduplication of the other data block further includes, in response to creating the entry in the MWDC:
determining whether the MWDC contains more than a threshold number of entries;
in response to determining that the MWDC contains more than the threshold number of entries, evicting a least recently used entry from the MWDC.

11. The method of claim 1 wherein the method further comprises, in response to deduplicating the data block and the other data block with reference to the located mapping structure, promoting the entry to a position within the MWDC indicating that it has been accessed more recently.

12. The method of claim 1 wherein the method further comprises, in response to deduplicating the data block and the other data block with reference to the located mapping structure:
determining whether the entry has been accessed more than a threshold number of times;
in response to determining that the entry has been accessed more than the threshold number of times promoting the entry from a lower level of the MWDC to a most recently accessed position of a higher level of the MWDC, the higher level of the MWDC providing more of a barrier to the entry aging out of the MWDC than a lower level of the MWDC.

13. The method of claim 1 wherein the method further comprises, in response to deduplicating the data block and the other data block with reference to the located mapping structure:
determining whether the entry has been accessed more than a threshold number of times;
in response to determining that the entry has not been accessed more than the threshold number of times promoting the entry to a most recently accessed position of a lower level of the MWDC, the lower level of the MWDC providing less of a barrier to the entry aging out of the MWDC than a higher level of the MWDC.

14. The method of claim 1 wherein searching the MWDC for the digest includes indexing into the MWDC using a combination of the digest and an identifier of the filesystem.

15. The method of claim 1 wherein the metadata about the other data block includes:
a pointer to where the other data block was previously persistently-stored by the computing device; and
a weight value indicating how many locations within the filesystem share the other data block.

16. A computing apparatus for performing deduplication of data stored thereon, the apparatus comprising:
persistent storage hardware for persistently storing data including one or more filesystems;
system memory; and
processing circuitry, wherein the processing circuitry coupled to the system memory is configured to perform deduplication of data of a filesystem of the one or more filesystems by:
obtaining a digest of a data block logically-positioned within the filesystem, the digest providing a hash value of data of the data block;
searching a Most Wanted Digest Cache (MWDC) within the system memory for the digest;
locating an entry in the MWDC within the system memory using the digest, wherein this locating indicates that the data block has the same data as another data block located elsewhere within the filesystem, the other data block having been previously persistently-stored by the apparatus, the entry having been added to the MWDC in response to the other data block having been deduplicated at least a plural number of times;
locating a mapping structure referenced by the entry located from the MWDC, the mapping structure providing metadata about the other data block;

deduplicating the data block and the other data block with reference to the located mapping structure; and performing a preliminary deduplication of the other data block by:
- reading a digest (hereinafter "third digest") of yet another (hereinafter "third") data block from yet another (hereinafter "third") mapping structure, the third digest providing a hash value of data of the third data block, the third data block already being stored at a first address of persistent storage different than a second address of persistent storage where the other data block is stored, the third data block being pointed to by the third mapping structure;
- searching the MWDC within system memory of the computing device for the third digest;
- in response to failing to find the third digest in the MWDC, obtaining a persistent entry from a persistent digest log stored in secondary storage of the computing device using the digest of the third data block, wherein this obtaining indicates that the third data block has the same data as the other data block, the other data block having been previously persistently-stored by the computing device, the persistent entry having been added to the persistent digest log in response to the other data block having been analyzed by a background deduplication process;
- locating the mapping structure of the other data block as referenced by the persistent entry obtained from the persistent digest log;
- determining a popularity value of the other data block and comparing the popularity value to the plural number of times;
- in response to the popularity value of the other data block being at least the plural number of times, creating the entry in the MWDC indexed by the digest and inserting a reference to the mapping structure within the entry in the MWDC; and
- deduplicating the third data block and the other data block with reference to the located mapping structure.

17. A computer program product comprising a non-transitory computer-readable storage medium storing a set of instructions, which, when performed by a computing device, cause the computing device to perform deduplication of data stored on the computing device by:

obtaining a digest of a data block logically-positioned within a filesystem managed by the computing device, the digest providing a hash value of data of the data block;

searching a Most Wanted Digest Cache (MWDC) within system memory of the computing device for the digest;

locating an entry in the MWDC within system memory using the digest, wherein this locating indicates that the data block has the same data as another data block located elsewhere within the filesystem, the other data block having been previously persistently-stored by the computing device, the entry having been added to the MWDC in response to the other data block having been deduplicated at least a plural number of times;

locating a mapping structure referenced by the entry located from the MWDC, the mapping structure providing metadata about the other data block;

deduplicating the data block and the other data block with reference to the located mapping structure; and performing a preliminary deduplication of the other data block by:
- reading a digest (hereinafter "third digest") of yet another (hereinafter "third") data block from yet another (hereinafter "third") mapping structure, the third digest providing a hash value of data of the third data block, the third data block already being stored at a first address of persistent storage different than a second address of persistent storage where the other data block is stored, the third data block being pointed to by the third mapping structure;
- searching the MWDC within system memory of the computing device for the third digest;
- in response to failing to find the third digest in the MWDC, obtaining a persistent entry from a persistent digest log stored in secondary storage of the computing device using the digest of the third data block, wherein this obtaining indicates that the third data block has the same data as the other data block, the other data block having been previously persistently-stored by the computing device, the persistent entry having been added to the persistent digest log in response to the other data block having been analyzed by a background deduplication process;
- locating the mapping structure of the other data block as referenced by the persistent entry obtained from the persistent digest log;
- determining a popularity value of the other data block and comparing the popularity value to the plural number of times;
- in response to the popularity value of the other data block being at least the plural number of times, creating the entry in the MWDC indexed by the digest and inserting a reference to the mapping structure within the entry in the MWDC; and deduplicating the third data block and the other data block with reference to the located mapping structure.

* * * * *